United States Patent [19]

Hatfield et al.

[11] Patent Number: 5,257,178
[45] Date of Patent: Oct. 26, 1993

[54] METHOD OF OPTIMALLY OPERATING A COMPUTER NUMERICAL CONTROL MILLING MACHINE TO MILL OPTIMAL HIGH DENSITY INTERCONNECT SUBSTRATES

[75] Inventors: William T. Hatfield, Schenectady; William W. Rohling, Scotia; Wolfgang Daum, Schenectady; Carl L. Chalek, Scotia, all of N.Y.

[73] Assignee: General Electric Company, Schenectady, N.Y.

[21] Appl. No.: 810,793

[22] Filed: Dec. 19, 1991

[51] Int. Cl.⁵ .............................................. G05B 19/18
[52] U.S. Cl. ................................ 364/191; 364/474.15; 437/225
[58] Field of Search ............. 364/191, 474.13, 474.15, 364/474.34, 490; 361/392, 401, 417; 29/592.1, 825; 437/225

[56] References Cited

U.S. PATENT DOCUMENTS

| | | | |
|---|---|---|---|
| 4,120,583 | 10/1978 | Hyatt | 364/474.34 |
| 4,374,457 | 2/1983 | Wiech, Jr. | 361/401 |
| 4,604,678 | 8/1986 | Hagner | 361/401 |
| 4,714,516 | 12/1987 | Eichelberger et al. | 156/628 |
| 4,764,485 | 8/1988 | Loughran et al. | 437/225 |
| 4,780,177 | 10/1988 | Wojnarowski et al. | 156/643 |
| 4,783,695 | 11/1988 | Eichelberger et al. | 257/668 |
| 4,835,704 | 5/1989 | Eichelberger et al. | 364/490 |
| 4,842,677 | 6/1989 | Wojnarowski et al. | 156/643 |
| 4,878,991 | 11/1989 | Eichelberger et al. | 156/630 |
| 4,884,122 | 11/1989 | Eichelberger et al. | 257/48 |
| 4,894,115 | 1/1990 | Eichelberger et al. | 156/643 |
| 4,937,203 | 6/1990 | Eichelberger et al. | 437/51 |

OTHER PUBLICATIONS

"DM 2800 Operation & Programming Manual", by Dyna Mechtronics, 926W Maude Avenue, Sunnyvale, California, 94086 (Mar. 1989).

Primary Examiner—Jerry Smith
Assistant Examiner—Paul Gordon
Attorney, Agent, or Firm—Marvin Snyder; Geoffrey H. Krauss

[57] ABSTRACT

A method for optimally operating a computer numerical control (CNC) milling machine to form cavities in a ceramic substrate for receiving IC chips and other components of a high density interconnect structure electrically interconnected by a multi-layer interconnect (HDI) structure. Generation of the CNC program instructions is based on locations and dimensions of the components which, through a set of design rules, provide locations and dimensions for an initial set of cavities corresponding to the components on a one-for-one basis. Depending upon the particular arrangement of the components, specific neighboring cavities of the initial set may either overlap or be separated by walls. A representation of the location and dimensions of each of the cavities of the initial set is formed, and the representation is enhanced by a "combine pockets" step and by a "remove borders" step to represent locations and dimensions of cavities of an optimized set. CNC program instructions for the milling machine are then generated for forming the cavities of the optimized set.

8 Claims, 22 Drawing Sheets

METHOD OF OPTIMALLY OPERATING A COMPUTER NUMERICAL CONTROL MILLING MACHINE TO MILL OPTIMAL HIGH DENSITY INTERCONNECT SUBSTRATES

CONTRACT CLAUSE

This invention was made with Government support under contract 87F-362600 awarded by DARPA. The U.S. Government has certain rights in this invention.

MICROFICHE APPENDIX

This specification includes a computer program listing in microfiche appendix form, comprising one microfiche with a total of 45 frames.

BACKGROUND OF THE INVENTION

This invention relates to formation of cavities in ceramic substrates for receiving integrated circuit chips and other components of a high density interconnect (HDI) structure and, more particularly, to methods for optimally operating a computer numerical control (CNC) milling machine to form such cavities.

As disclosed in Eichelberger et al. U.S. Pat. No. 4,783,695, and related patents, a high density interconnect (HDI) structure which has been developed by General Electric Company offers many advantages in the compact assembly of digital and other electronic systems. For example, an electronic system such as a microcomputer which incorporates between thirty and fifty chips, or even more, can be fully assembled and interconnected on a single substrate which is fifty mm ( roughly two inches) long by fifty mm wide by 1.27 mm (50 mils) thick. This high density interconnect structure can be disassembled for repair or replacement of a faulty component and then reassembled without significant risk to the good components incorporated in the system. Repairability is particularly important where fifty or more chips having a cost of as much as $2,000.00 each, may be incorporated in a single system on one substrate. This repairability is a substantial advance over prior interconnection systems in which reworking the system to replace damaged components is either impossible or involves substantial risk to the good components. Exemplary testing and repair techniques are disclosed in Eichelberger et al. U.S. Pat. Nos. 4,878,991, 4,884,122 and 4,937,203.

Briefly, in systems employing this high density interconnect structure, a ceramic substrate is provided. The ceramic substrate may be made of alumina, for example, with a thickness between 0.635 and 2.54 mm (25 and 100 mils, respectively). The substrate is of appropriate size and strength for the overall system, typically less than fifty mm square.

Once the positions of the various chips have been specified, individual cavities or one large cavity having appropriate depths at the intended locations of the various chips are prepared. This may be done by starting with a bare substrate having a uniform thickness and the desired size. Conventional, laser or ultrasonic milling may be used to form the cavities in which the various chips and other components will be positioned. For systems where it is desired to place chips of uniform size edge-to-edge, a single large cavity may be satisfactory. That large cavity has a uniform depth where the semiconductor chips have a substantially uniform thickness.

Typically, however, an electronic system includes chips and other components having a variety of overall sizes and thicknesses, and there are a plurality of cavities. Where a relatively thicker or a relatively thinner component will be placed, the corresponding cavity bottom must be made respectively deeper or shallower to place the upper surface of that component in substantially the same plane as the upper surface of the rest of the components and the surface of the unmilled portion of the substrate which surrounds the cavity.

The cavity bottoms are then each provided with a thermoplastic adhesive layer which may preferably be polyetherimide resin available under the trade name ULTEM ® from the General Electric Company, Pittsfield, MA. The various components are then placed in their desired locations within the cavities. The entire structure is heated to the softening point of the ULTEM polyetherimide (in the vicinity of 217° C. to 235° C. depending on the formulation used) and then cooled to thermoplastically bond the individual components to the substrate. At this stage, the upper surfaces of all components and the substrate are disposed in substantially a common plane.

Alternatively, after the cavities are formed, an initial layer of metallization may be deposited over the entire substrate, including the cavity bottoms, and then patterned to define conductors. This initial layer of metallization is termed "metal zero". Patterned "metal zero" conductors formed directly on the substrate are brought out to the edges of the substrate to ultimately facilitate electrical connection to the system. In some cases "metal zero" conductor areas remain in the cavity bottoms to form back side bias connections, and the chips or other components are attached with conductive adhesive to these "metal zero" conductor areas.

In either event, after the components are in place, a multi-layer interconnection structure is built up to electrically interconnect the components into an actual functioning system. To begin the interconnection structure, a polyimide dielectric film which is about 0.0005 to 0.003 inches and which may be KAPTON ® polyimide (12.5 to 75 thick), available from E.I. du Pont de Nemours and Company, Wilmington, DE, is pretreated to promote adhesion and coated on one side with an ULTEM polyetherimide resin or another thermoplastic.

The KAPTON polyimide film is then laminated across the tops of the chips, other components and the substrate, with the ULTEM resin serving as a thermoplastic adhesive to hold the KAPTON film in place.

Next, via holes are laser drilled in the KAPTON film and ULTEM adhesive layers in alignment with the contact pads on the electronic components to which it is desired to make contact. Exemplary laser drilling techniques are disclosed in Eichelberger et al. Pat. Nos. 4,714,516 and 4,894,115; and in Loughran et al. Pat. No. 4,764,485, all of which are assigned to the present assignee..

A metallization layer is deposited over the KAPTON film layer so as to extend into the via holes and make electrical contact to the contact pads disposed thereunder. This metallization layer may be patterned to form individual conductors during its deposition process, or may be deposited as a continuous layer and then patterned using photoresist and etching. The photoresist is preferably exposed using a laser which is scanned relative to the substrate to provide an accurately aligned conductor pattern at the end of the process. Exemplary techniques for patterning the metallization layer are disclosed in Wojnarowski et al. U.S. Pat No. 4,780,177 and 4,842,677; and in Eichelberger et al. Pat. No. 4,835,704, all of which are assigned to the present assignee.

Additional dielectric and metallization layers are provided as required in order to provide all of the desired electrical connections among the chips. Any misposition of the individual electronic components and their contact pads is compensated for by an adaptive laser lithography system as disclosed in Eichelberger et al. U.S. Pat. No. 4,835,704 which is assigned to the present assignee..

The designer of such a system incorporated in a high density interconnect (HDI) structure typically specifies the arrangement of the chips and other components to best suit circuit topology, without particular regard to the required cavities in the substrate, except to keep the overall size of the system such that it will fit on a fifty mm by fifty mm (roughly two inch by two inch) substrate, for example. Certain design rules are involved in the arrangement of the various components. For example, in order to allow for inaccuracies in a "pick and place" machine which places individual chips within cavities on the substrate, a specific minimum distance between neighboring chips must be maintained, for example 0.400 mm (15.75 mils). Although not an initial concern of the circuit designer, a related consideration is that the individual cavities must be larger than the chips, for example, by about 0.254 mm (10 mils) on each side. It would be difficult to automatically place chips in cavities which were precisely to size, necessitating exact positioning.

As a result of these considerations, what is known at the time when the cavities are to be formed, based on the locations and dimensions of the various components, are locations and dimensions of a set of cavities corresponding to the components on a one-for-one basis. Particular neighboring cavities of this set will either overlap or be separated by walls, since they were not dealt with being that they were not of concern during the initial stages of circuit design and layout.

A suitable machine for milling such cavities in a substrate is a model DM2800 computer numerical control (CNC) milling machine made by Dyna Mechtronics, of Sunnyvale, California. Although intended for milling metal, the DM2800 CNC milling machine, when appropriately programmed, has been found suitable for milling ceramic substrates, which have a hardness approaching that of diamond. As is known, such CNC milling machines operate under program control and execute program instructions in a particular language which includes such instructions as move to a particular point in space, repeat a sequence of instructions a specified number of times, skip to a particular instruction step, and execute a subroutine.

There exist so-called computer aided manufacturing (CAM) programs which serve to take the specification of a part, potentially a complex part, and generate CNC program instructions to direct a milling machine to form that part. However, application of such CAM program to the specific task of generating CNC instructions for milling an HDI substrate has a number of disadvantages. As one example, such CAM program may leave extremely thin and thus fragile walls between neighboring cavities. The thin walls are highly prone to subsequent breakage. As another deficiency, such prior CAM programs generate CNC instructions which produce overlapping cavities that are milled separately and independently, resulting in an inefficient and slower tool path.

Prior CAM programs exhibit a variety of other deficiencies when their use is attempted for the particular application of generating CNC instructions to mill ceramic HDI substrates. Such CAM programs generally operate to minimize tool movement. While this is a reasonable approach when milling metal, when ceramic is milled, minimizing tool wear is a significant consideration, which must be taken into account when specifying a tool path. As noted above, the ceramic HDI substrate material is very hard, almost as hard as diamond. Also, a CAM program intended for generating program instructions for milling metal will generally not generate program instructions which result in producing a suitably smooth finish when milling ceramic.

SUMMARY OF THE INVENTION

Accordingly, it is an object of the invention to provide a method for optimally directing a CNC milling machine to form a cavity or cavities for components to be interconnected by means of an HDI structure as briefly described hereinabove.

It is a related object of the invention to provide a method for operating a CNC milling machine to produce an optimal HDI substrate in minimal time.

It is a related object of the invention to provide a method for operating a CNC milling machine in a manner which results in minimal tool wear when milling a ceramic substrate.

Briefly, in accordance with a preferred embodiment of the invention, a method is provided for optimally directing a CNC milling machine to form in a substrate at least one cavity for a plurality of electronic components to be interconnected through a structure overlying and bonded to the substrate and the components. Program instructions for the CNC milling machine are generated based on locations and dimensions of the components which, through a set of design rules, provide locations and dimensions of an initial set of cavities corresponding to the components on a one-for-one basis. Depending upon the particular arrangement of the components, particular neighboring cavities of the initial set may either overlap or be separated by walls.

The method includes an initial step of forming a representation of the location and dimensions of each of the cavities of the initial set. Typically, the representation is in the form of a computer screen display based on data stored in the computer memory, or other storage medium.

Next, the representation is enhanced to represent locations and dimensions of cavities of an optimized set by employing a "combine pockets" step and a "remove borders" step.

The "combine pockets" step includes determining which cavities of the initial set overlap, are in alignment, and have depths within a predetermined tolerance of each other, if any cavities satisfy these three conditions. Then, the overlapping cavities are combined to define a single cavity. Such single cavity is milled much more efficiently than the plurality of cavities of the initial set.

The "remove borders" step includes selectively removing walls separating neighboring cavities having less than a predetermined minimal wall thickness by extending at least one of the cavities to meet another cavity. Typically, this step comprises extending a shallower one of the neighboring cavities to meet a deeper one of the neighboring cavities.

In an automated process for the "remove borders" step, each cavity in turn is checked against its neighbors on all four sides. Thus, for each cavity, each adjacent cavity is examined and, for each adjacent cavity at least partially in alignment and sharing a common wall, the common walls having a thickness less than a predetermined thickness are determined, and such common walls are removed.

Finally, CNC program instructions are generated for forming the cavities of the optimized set. Instructions for tool movement are generated so as to minimize tool wear when milling a ceramic substrate.

BRIEF DESCRIPTION OF THE DRAWINGS

While the novel features of the invention are set forth with particularity in the appended claims, the invention, both as organization and content, will be better understood and appreciated from the following detailed description, taken in conjunction with the drawings, in which:

DETAILED DESCRIPTION

Figure 1:
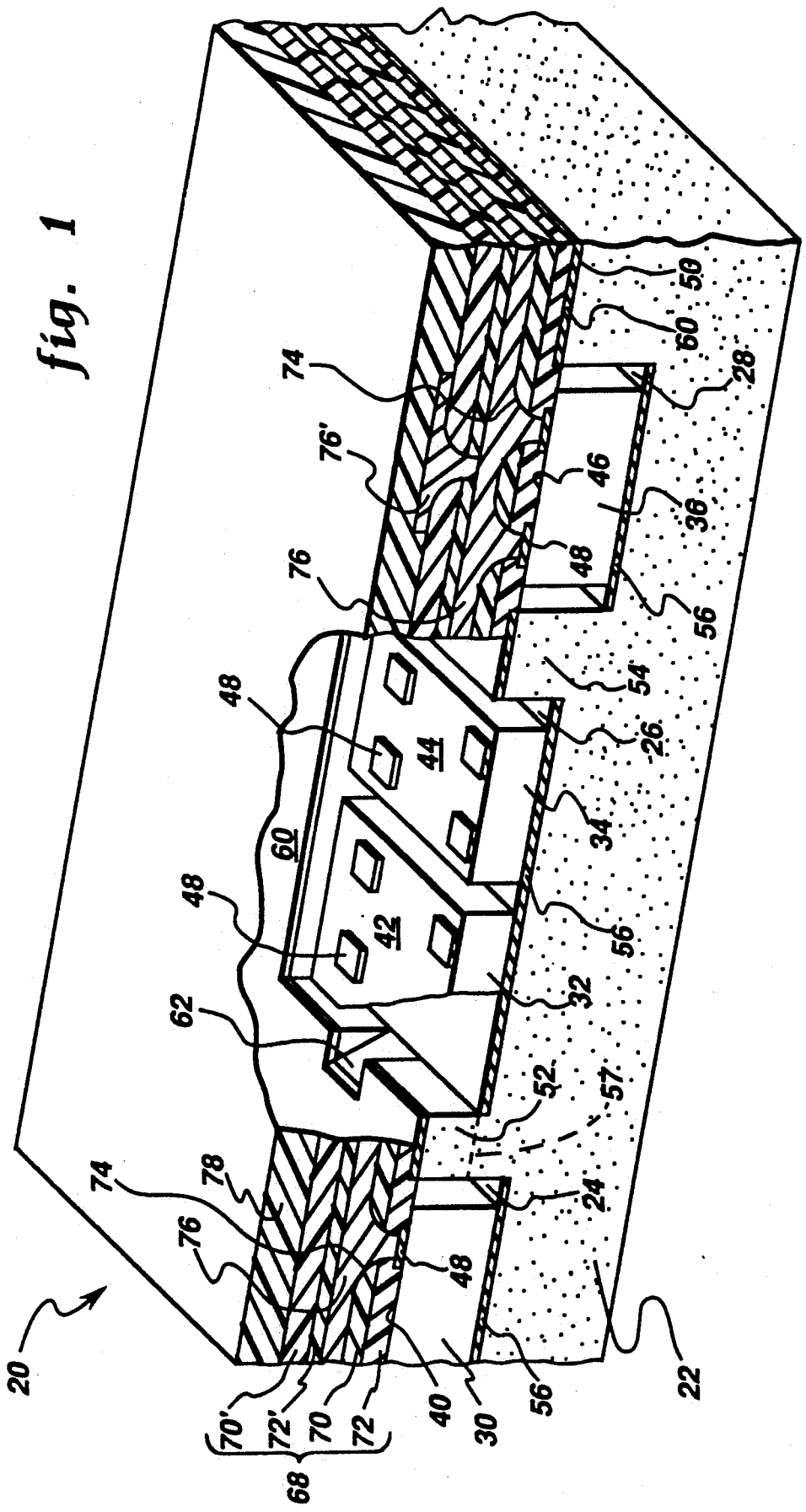
FIG. 1 is a perspective, cutaway view illustrating an HDI structure comprising a plurality of integrated circuit chips mounted in cavities formed in a ceramic substrate and interconnected over their upper surfaces.

FIG. 1 depicts a portion of an electronic system 20 employing a high density interconnect (HDI) structure. The electronic system 20 includes a ceramic substrate 22 having representative cavities 24, 26 and 28 milled by a CNC milling machine executing CNC program instructions generated in accordance with the subject invention. As described hereinabove, substrate 22 may, for example, be 2.54 mm (100 mils) thick, and of appropriate size and strength for the overall system. A typical size is fifty mm (about two inches) square.

Placed within the various cavities 24, 26 and 28 are a plurality of components in the representative form of individual integrated circuit chips 30, 32, 34 and 36. These chips have respective upper surfaces 40, 42, 44 and 46 with representative contact pads 48 disposed thereon.

Chip upper surfaces 40, 42, 44 and 46 are all generally even with (i.e. lie in a common plane with) each other and with an upper surface 50 of substrate 22, the substrate 22 upper surface 50 being an unmilled portion of substrate 22. As is apparent from FIG. 1, chips 32 and 34 are relatively thinner than chips 30 and 36, and cavity 26 within which chips 32 and 34 are positioned is not as deep as cavities 24 and 28 within which chips 30 and 36 are respectively positioned.

Also evident in FIG. 1 are design rule considerations whereby cavity dimensions are implied by chip dimensions. Thus, for example, chip 36 is placed in a cavity 28 which is larger than the chip so as to provide space around the chip to accommodate variations in precise location as the chip is inserted into the cavity by a "pick and place" machine (not shown). As discussed hereinabove, a circuit designer will generally specify the locations of chips 30, 32, 34 and 36. The dimensions of cavities 24, 26 and 28 are then implied or determined by the application of design rules.

In the case of chips 32 and 34, these design rules result in the definition of cavities corresponding to each. However, because the cavities are larger than the chips, and because the chips are close together, the resultant cavities overlap and, after milling, are indistinguishable from and actually comprise a single large cavity 26, even though they might be individually milled in accordance with prior CAM techniques. In other words, a common wall which would otherwise separate individual cavities holding chips 32 and 34 is completely eliminated during the milling process. According to the invention, rather than generating CNC program instructions for producing two individual cavities for chips 32 and 34, CNC program instructions for producing the single larger cavity 26 are generated, resulting in a more efficient milling operation.

Also evident in FIG. 1 are a wall 52 between cavities 24 and 26, and a wall 54 between cavities 26 and 28. Chips 30 and 32 and chips 34 and 36 are sufficiently spaced apart such that, even when the design rules have been applied, there is no overlap between the cavities. In some cases, walls 52 and 54, are extremely thin and thus unduly subject to breakage, particularly in view of the brittle nature of the ceramic substrate material. In those situations, it is best for such thin walls to be eliminated. Wall 52, as illustrated has sufficient thickness that it may remain; however, for purposes of illustrating the invention, assume that it would be desirable to eliminate wall 52. In that instance, shallower cavity 26 would be extended to meet deeper cavity 24, as indicated by a dashed line 57 representing a potential extension of cavity 26. Ordinarily a shallower cavity would be extended to meet a deeper cavity, rather than vice versa, to avoid undercutting substrate material below the potential location of a chip, which could result in locally inadequate heat sinking.

Also shown in FIG. 1 is a "metal zero" layer optionally deposited on substrate 22 after milling, but before chips 30, 32, 34 and 36 are placed. In the bottoms of cavities 24, 26 and 28, this metal zero layer is designated 56. On the substrate upper surface 50, this metal zero layer is designated 60. Although not shown in FIG. 1, the metal zero layer, particularly portion 60 thereof on the substrate upper surface 50, is typically patterned, particularly around the edges (not shown) of the substrate, in order to facilitate external connections to electronic system 20.

Metal zero layer portions 56 in the bottoms of cavities 24, 26 and 28 may serve as back side bias connections in the case of chips 30, 32, 34 and 36, which are attached with conductive adhesive. In order to provide reliable electrical connection to lower metal zero areas 56, a level or ramp-like structure 62 is milled in substrate 22 from its upper surface 50 down to the bottom of cavity 26, for example. Typical metal deposition processes, such as sputtering, are otherwise likely to leave metal discontinuities along vertical cavity sidewalls, and the bevel or ramp 62 reliably facilitates continuous metal deposition for electrical continuity.

To complete the FIG. 1 structure, an interconnection structure in the form of an overcoat 68 is built up as described in the various patents referred to hereinabove. Briefly, a polyimide film 70, such as KAPTON polyetherimide, which is about 12.5 to 75 microns (0.5 to 3.0 mils) thick, is pre-treated on one side with a coating of ULTEM polyetherimide resin 72, or another thermoplastic, in order to promote adhesion, and laminated across the tops 40, 42, 44 and 46 of chips 30, 32, 34 and 36, respectively and across the upper, unmilled surface 50 of substrate 22. Thereafter, via holes 74 are laser drilled in the KAPTON polyetherimide 70 and ULTEM adhesive 72 layers in alignment with contact pads 48 on chips 30, 32, 34 and 36 to which it is desired to make contact.

Buildup of an HDI overcoat 68 continues by depositing a patterned metallization layer 76 over KAPTON layer 70 so as to extend into via holes 74 to make electrical contact with contact pads 48. Additional dielectric and metallization layers are provided as required in order to provide all of the desired electrical connections among chips 30, 32, 34 and 36, such as representative KAPTON dielectric layer 70', representative ULTEM adhesive layer 72', and representative metallization layer 76'. Preferably, a final dielectric layer 78, such as KAPTON, is formed to cover the overall structure.

Figure 2:
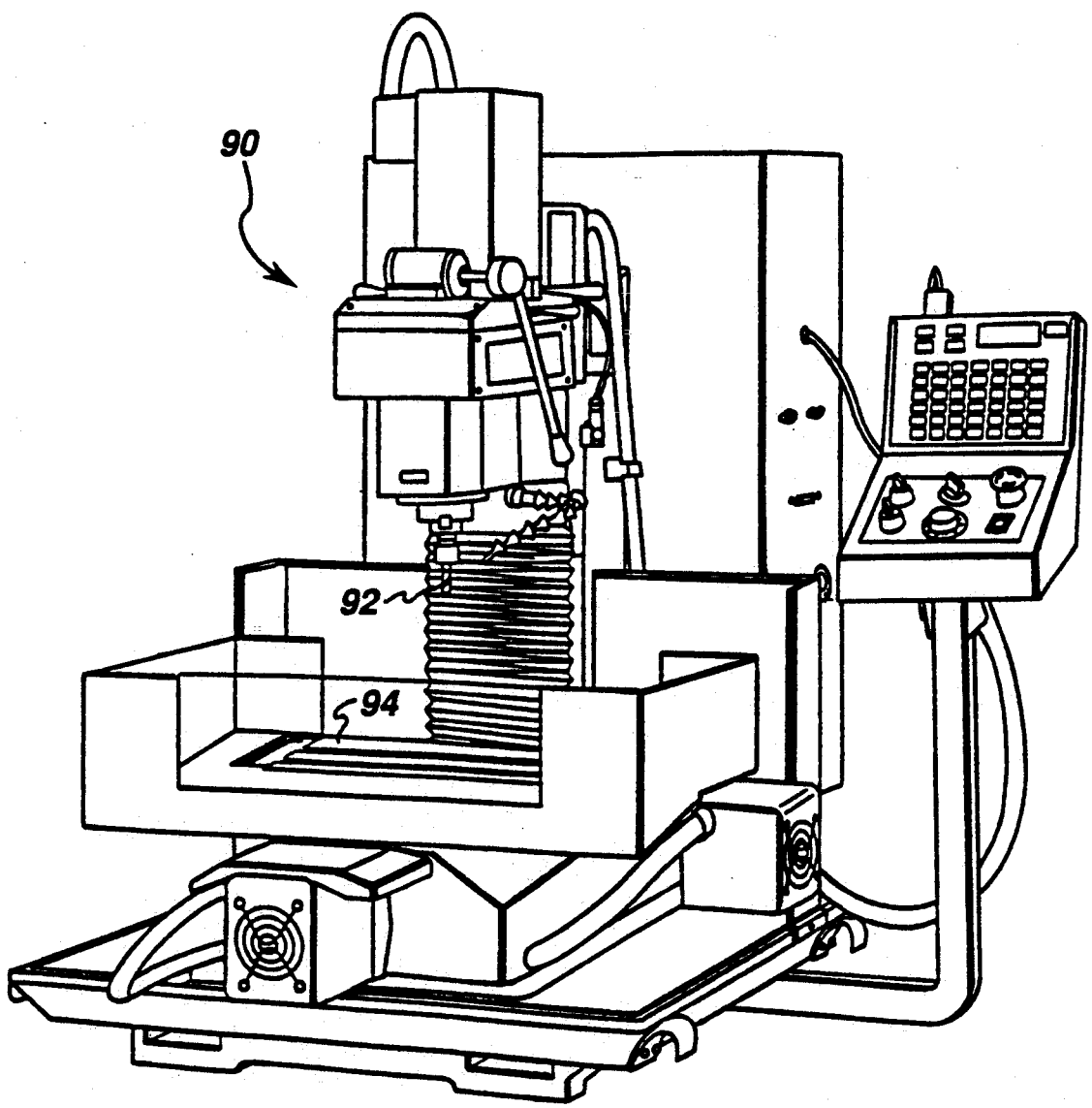
FIG. 2 depicts a model DM2800 CNC milling machine which may be to form the cavities in the substrate of FIG. 1.

FIG. 2 depicts a typical CNC milling machine 90, such as may be used to form cavities 24, 26 and 28 in the ceramic substrate of FIG. 1. The illustrated milling machine is a Dyna Myte model DM2800 manufactured by Dyna Mechtronics, 926 W Maude Avenue, Sunnyvale, California. The machine is capable of precision three-axis movement of a rotating tool 92 in order to mill a work piece (not shown) placed within a work piece holder area 94. Although the DM2800 CNC milling machine is intended for milling metal, in accordance with the present invention the machine has been found suitable for milling ceramic HDI substrates, when appropriately programmed.

Figure 3:
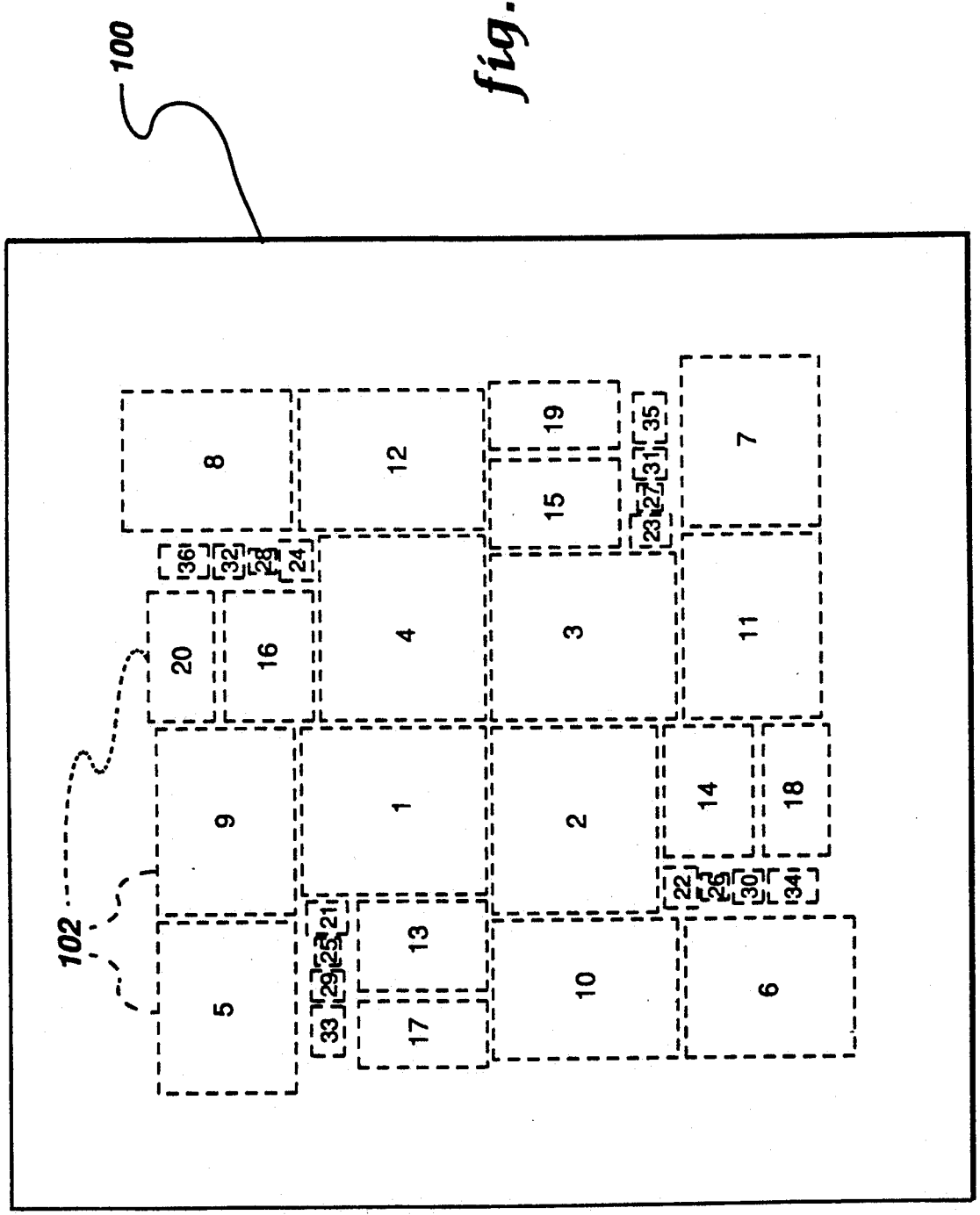
FIG. 3 an illustration of an on-screen computer display a typical HDI ceramic substrate by the locations of the integrated circuit chips only, without showing the locations and dimensions of the substrate cavities which are implied by the chip locations when design rules are applied.

FIG. 3 depicts a typical HDI substrate 100 in plan view as the substrate 100 may be represented, for example, on a computer video display. The extent of substrate 100 of FIG. 3 corresponds to the outer boundaries of the FIG. 1 substrate 22. Also shown in FIG. 3 are the locations of a plurality of integrated circuit chips 102, individually designated "1" through "36". In FIG. 3 the locations of chips 102 are shown by dashed lines; on a computer screen they may be indicated using lines and numbers of a particular color, for example, light gray. The chips placement is provided by a circuit designer in an arrangement as shown in FIG. 3, which best suits circuit topology. In order to allow for inaccuracies in a "pick and place" machine which places individual chips 102 within cavities on substrate 100, a certain minimum distance, for example 0.400 mm (15.75 mils) is maintained between neighboring chips 102. (This minimum distance between chips is less than twice the 0.254 mm (10 mil) allowance by which cavity dimensions exceed chip dimensions on each side. Thus cavities may overlap.)

Although not depicted in FIG. 3, the locations of chips 102 also determine the locations and dimensions of a set of cavities corresponding to the chips on a one-for-one basis. As discussed hereinabove with reference to FIG. 1, and in accordance with established design rules, each individual cavity is larger than the chips contained therein, and the cavities may overlap (encroach upon each other).

APPENDIX A is a printout of an "information file" as may be produced by an HDI computer aided design (CAD) system employed by a circuit designer in determining placement of, and interconnections between, chips 102. The APPENDIX A information file is generally representative of the chip arrangement depicted graphically in FIG. 3, and the file itself constitutes a data structure.

Thus, initially considering the second part of APPENDIX A (following the double horizontal line) beginning with the column heading "Chip #", the first column identifies individual integrated circuit chips by chip number "1" through "36". The second column heading "Name" identifies the part number for the particular chip. The third and fourth columns contain information not directly relevant to the present invention, namely, the relative orientation of each chip on the substrate, and the tool to be used by the "pick-and-place" machine to place the chip on the substrate, selected in accordance with the overall size of the chip.

The next five columns are the relevant locations and dimensions of the individual chips. Thus, the two columns identified as "Center" provide the x- and y coordinates of the center of each of the chips relative to a mill fiducial, while the three columns labeled "Dimension" give the x-axis, y-axis and z-axis dimensions of each of the chips. It will be appreciated that the z-axis dimensions, that is the numbers in the column beginning with representative entry 0.390, are the thickness of each of the chips in mm.

The final column headed "Pocket" in the second part of APPENDIX A identifies the pocket or cavity number initially assigned to each of the chips. The pockets or cavities initially correspond to the chips on a one-for-one basis and, as a matter of convenience, are initially assigned numbers identical to the chip numbers.

Considering now the first part of APPENDIX A, the "information file" begins with file header information, followed by locations and dimensions of the initial set of cavities corresponding to the chips on a one-for-one basis. Comparing the first part of APPENDIX A with the second part of APPENDIX A previously discussed, it will be seen that each pocket or cavity has the same center position as the corresponding chip, but the x-axis and y-axis dimensions are greater in accordance with the design rules as discussed hereinabove. However, the z-axis dimensions or depth of the pockets or cavities are identical to the chip z-axis dimensions, so that the chip upper surfaces lie in a common plane with the upper (unmilled) surface of the substrate, as discussed hereinabove with reference to FIG. 1. (Actually, the z-axis dimensions may be adjusted to account for the thickness of the adhesive layer which secures the chips to the substrate, typically 0.0254 to 0.0508 mm (1 to 2 mils).)

The final column in the first part of the file printout of APPENDIX A identifies the number of chips per pocket. Initially, since the cavities correspond to the chips on a one-for-one basis, there is only one chip per pocket.

Figure 4:
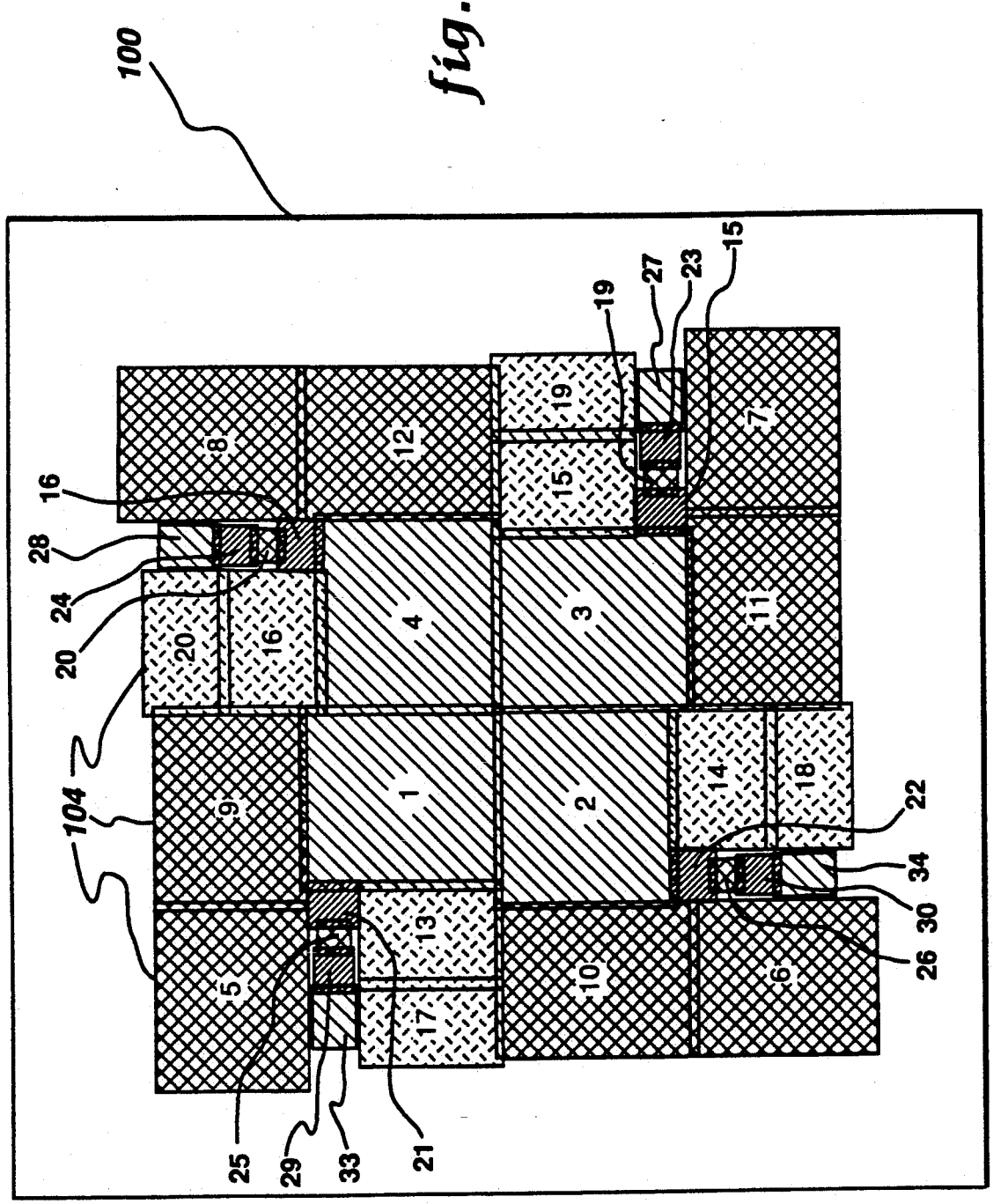
FIG. 4 is a plan view, lined for color, which is comparable to FIG. 3 except that the corresponding cavities in the substrate are represented.

FIG. 4 is comparable to FIG. 3, except that it depicts the cavities corresponding to the chips of FIG. 3. To provide a useful on-screen computer display, different cavity depths corresponding to different chip thicknesses are represented in different colors. In an actual on-screen display corresponding to FIG. 4, the outer boundaries of the represented cavities 104 are shown in white lines, and overlap or encroachment of one cavity into another is evident. In the on-screen representation, a color representing a relatively deeper cavity has precedence over a color representing a relatively shallower cavity. Thus, where cavities overlap or encroach on each other, the area of overlap is indicated as the color of the relatively deeper of the two cavities, although the outer boundaries of all cavities are shown in white. Also, the actual chip locations 102 of FIG. 3 would be shown in gray. However, for clarity of illustration these are omitted from FIG. 4.

Referring to FIG. 4 and APPENDIX A together, the thickest chips and therefore deepest cavities are numbers "5" through "12" and "25" through "28", which are all lined arbitrarily to indicate the color pink, for example. Although cavities "5" through "12" have a depth of 0.534 mm, and cavities "25" through "28" have a slightly different depth of 0.532 mm, these different depths are within a predetermined tolerance (e.g., ±0.127 mm) of each other, and are treated as identical for purposes of display.

The next shallower cavities are cavities "13" through "20" which are lined arbitrarily to indicate the color orange, for example. Each has a depth of 0.445 mm.

Continuing in order of decreasing thickness and thus cavity depth, lined arbitrarily to indicate the color blue are cavities "1" through "4" and "33" through "36". Again, and with reference also to APPENDIX A, two different actual depths 0.390 mm and 0.391 mm are predetermined tolerance of each other, and are treated as the same depth for the purpose of the representation.

Finally, the shallowest cavities for the thinnest chips are numbered "21" through "24" and "29" through "32", and are lined arbitrarily to indicate the color green. Again with reference to APPENDIX A, it will be seen that two different chip thicknesses 0.282 mm and 0.270 mm are treated the same for purposes of this representation.

Figure 5:
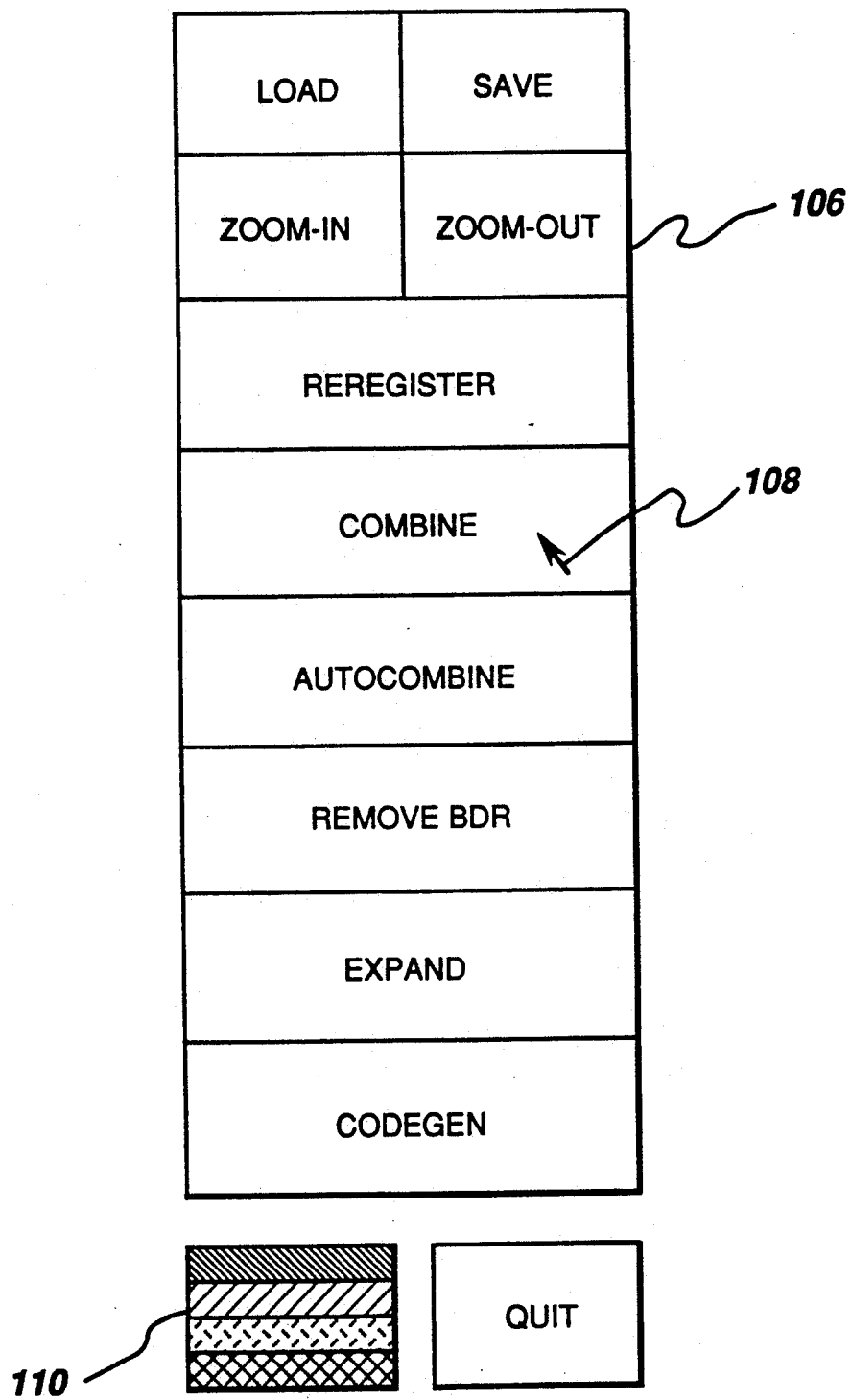
FIG. 5 is partly lined for color and depicts "command button" areas, of a graphical command interface as shown on a computer display.

FIG. 5 shows a graphical command interface which appears on the computer screen to the right of either FIG. 3 or FIG. 4 to facilitate user communication with the program when performing steps in accordance with the method of the invention. This graphical command interface permits enhancement of the FIG. 4 representation to depict locations and dimensions of cavities of an optimized set. In FIG. 5, the large box 106 has various program functions labeled, and these functions are selected by positioning a cursor 108 by means of a mouse, and "clicking" on the function. Various ones of these functions are described in detail hereinbelow.

Area 110 is lined for color, and is a key or reminder indicating the relative depths signified by each of the assigned colors. Thus, the relatively deepest cavity depth is represented by the color pink at the lower portion of key 110, and the relatively shallowest depth is represented by the color green at the top of key 110. Actually, FIG. 5 is somewhat abbreviated in this regard, as in the actual program implementation there are nine different colors to represent different cavity depths. This is the number of colors that can easily be called by the "C" language "fill" routine.

Figure 6:
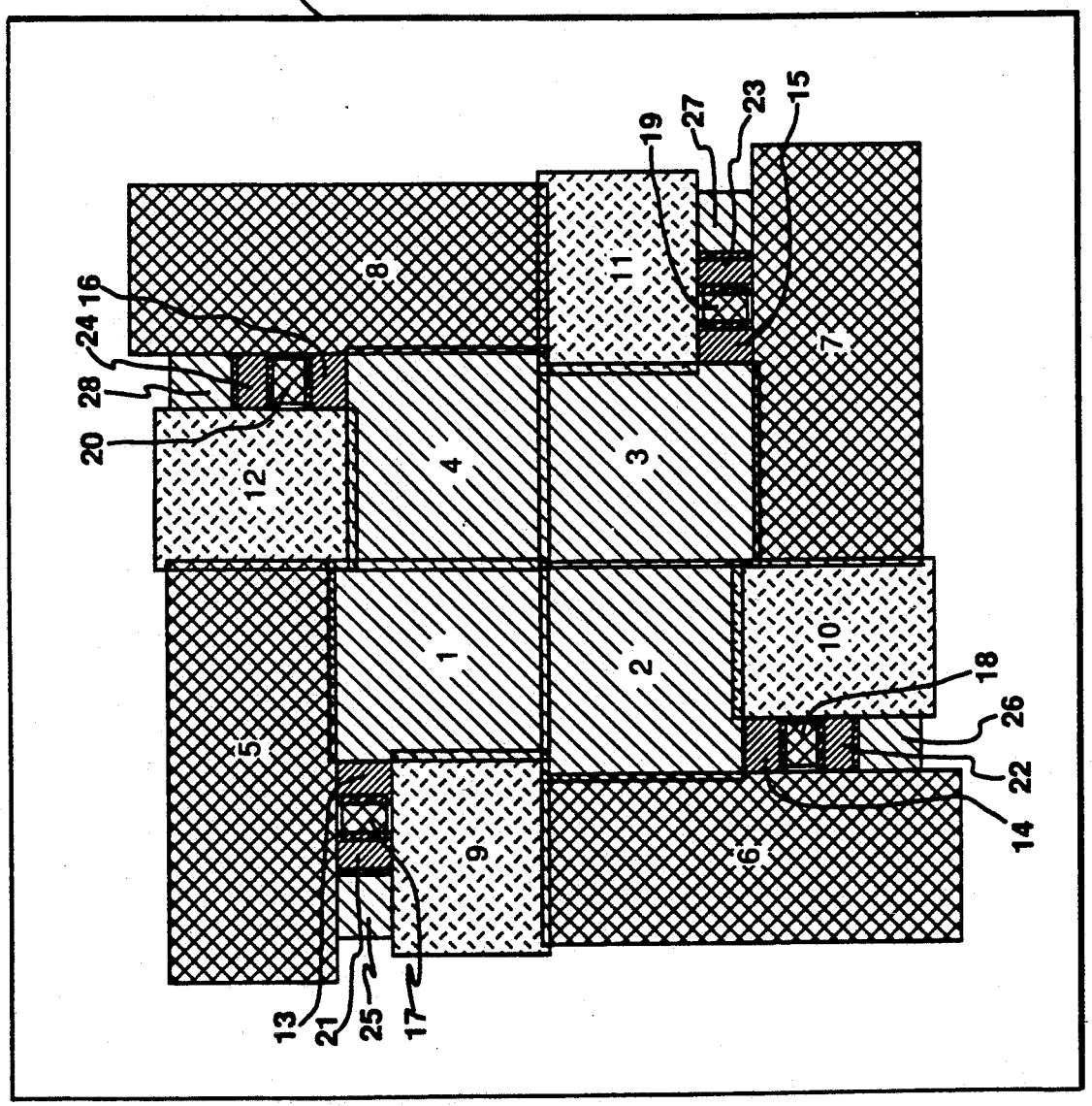
FIG. 6 which is lined for color, represents the illustration of FIG. 4 after a "combine pockets" operation.

FIG. 6 is comparable to FIG. 4, but illustrates the results of a "combine pockets" operation whereby the representation is enhanced by combining overlapping cavities to define a single cavity. By recognizing and combining such overlapping pockets, the efficiency of the milling procedure is maximized.

Specific criteria for a "combine pockets" operation are as follows:

(1) The two cavities overlap (encroach on each other;

(2) The two cavities line up exactly in either the x or y direction. In terms of the x- and y-coordinates of the cavities, this means that either:

(a) The x-coordinates of the center of the two cavities are equal and the width (x dimension) of the two cavities are equal; or (b) The y-coordinates of the center of the two cavities are equal and the height (y dimension) of the two cavities are equal; and (3) The depths of the two cavities are within ±0.127 mm (±0.5 mil) of each other.

Applying these criteria, as one example, cavities "5" and "9" of the initial set shown in FIG. 4 are combined into a single cavity "5" of the enhanced set, as depicted in FIG. 6. The following table indicates the complete results of the "combine pockets" operation:

TABLE

| Cavities of Initial Set (FIG. 4) | Combined Cavities of Enhanced Set (FIG. 6) |
| --- | --- |
| 5,9 | 5 |

TABLE -continued

| Cavities of Initial Set (FIG. 4) | Combined Cavities of Enhanced Set (FIG. 6) |
|---|---|
| 8,12 | 8 |
| 7,11 | 7 |
| 10,6 | 6 |
| 14,18 | 10 |
| 17,13 | 9 |
| 20,16 | 12 |
| 15,19 | 11 |

Figure 12:
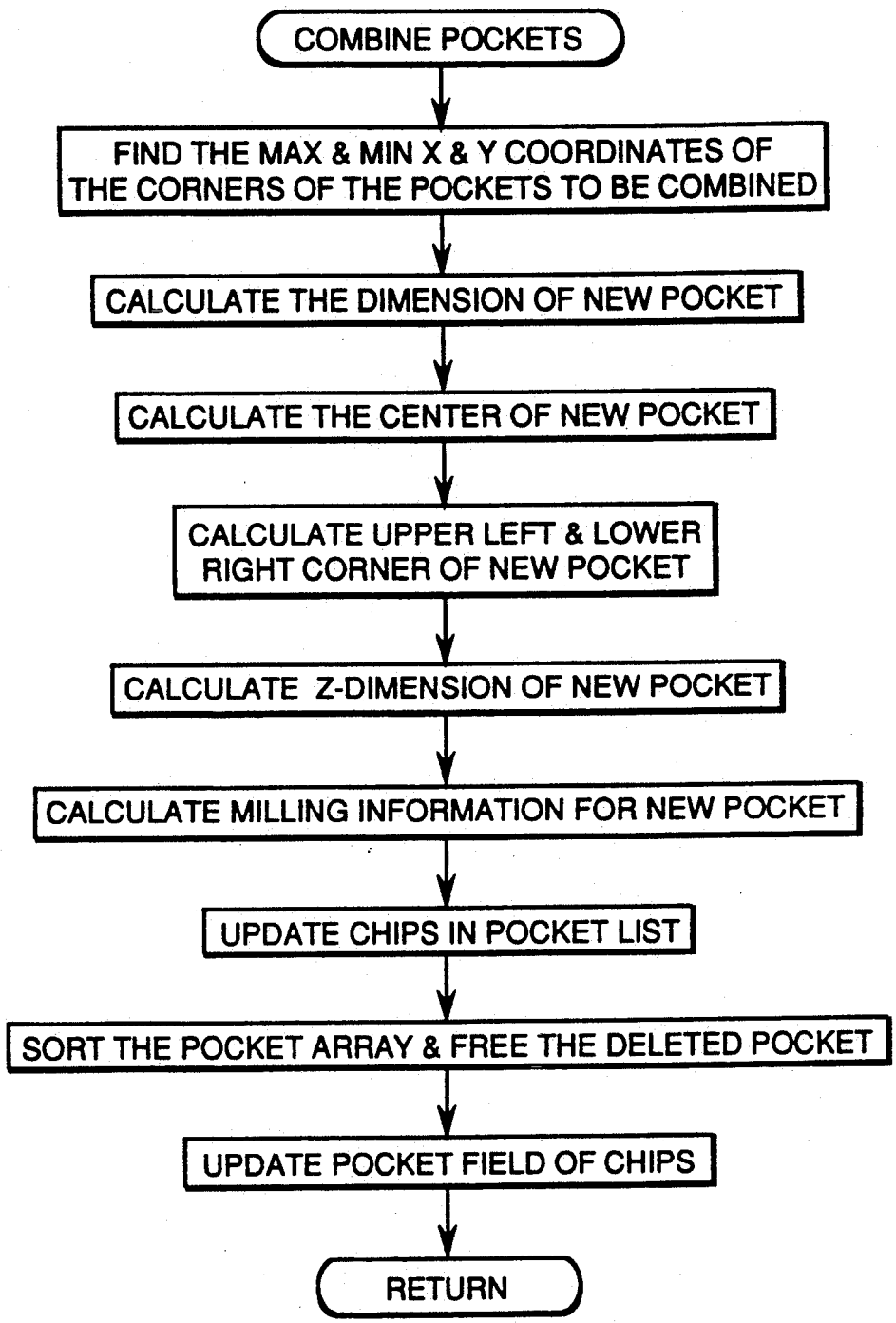
FIG. 12 is a flow chart representing program instructions for manually combining cavities.
Figure 13:
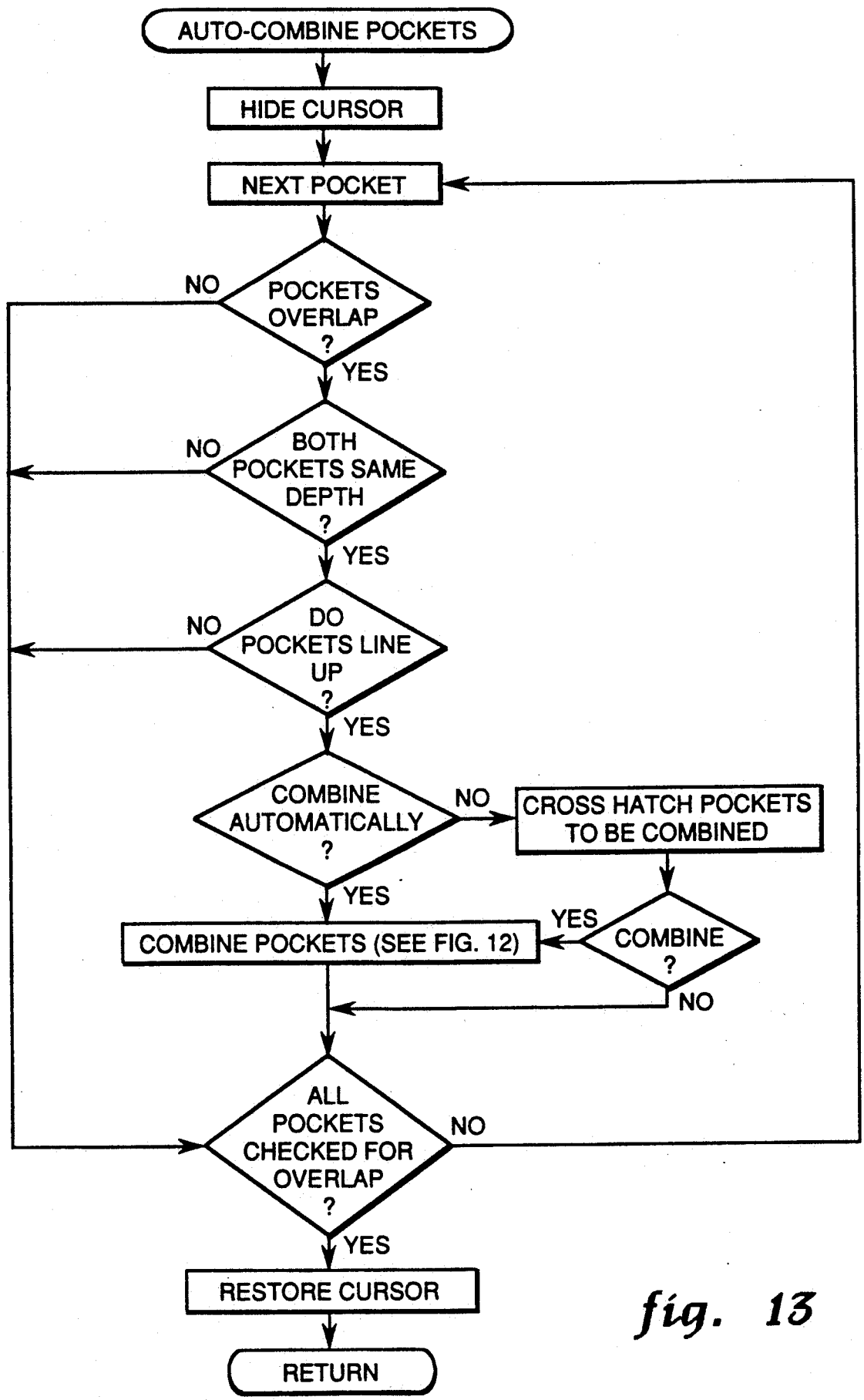
FIG. 13 is a flow chart representing program instructions for automatically combining cavities.
Figure 14:
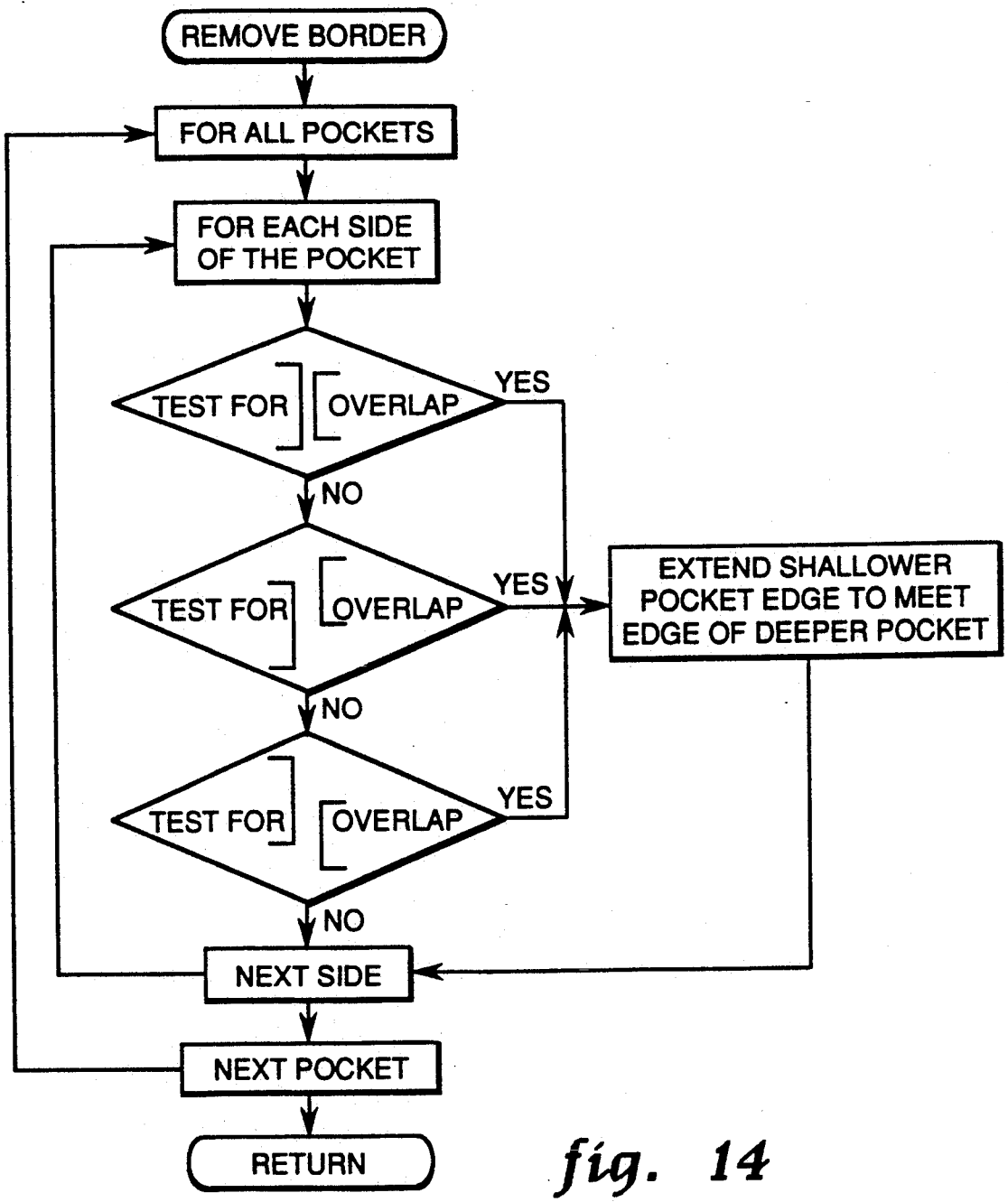
FIG. 14 is a flow chart representing program instructions for removing borders or walls between adjacent cavities.

The steps involved in a "combine pockets" operation as depicted in FIG. 6 are described in greater detail hereinbelow with reference to FIGS. 12 and 13.

Figure 7:
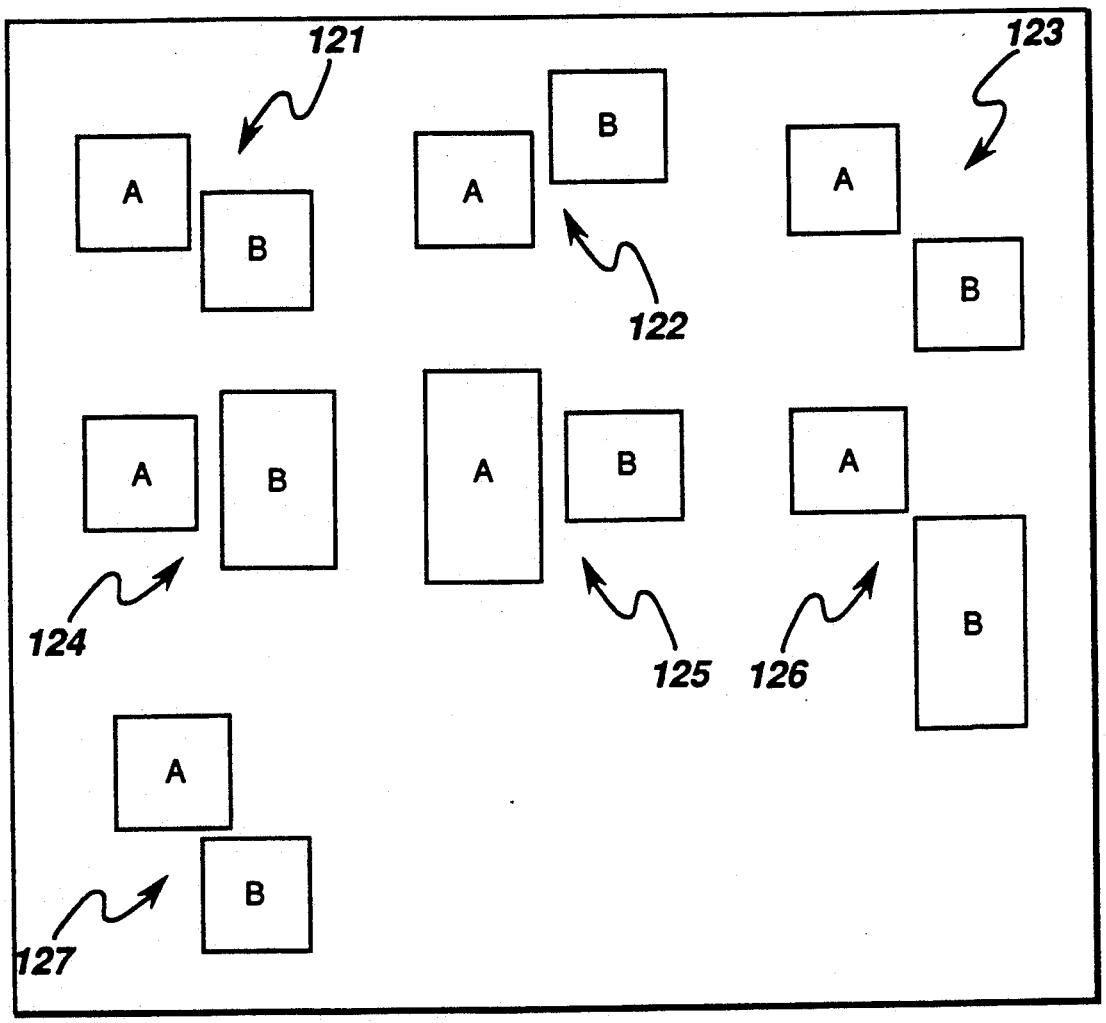
FIG. 7 is an illustration of an on-screen computer display that diagrammatically depicts criteria for border removal in an HDI ceramic substrate.
Figure 8:
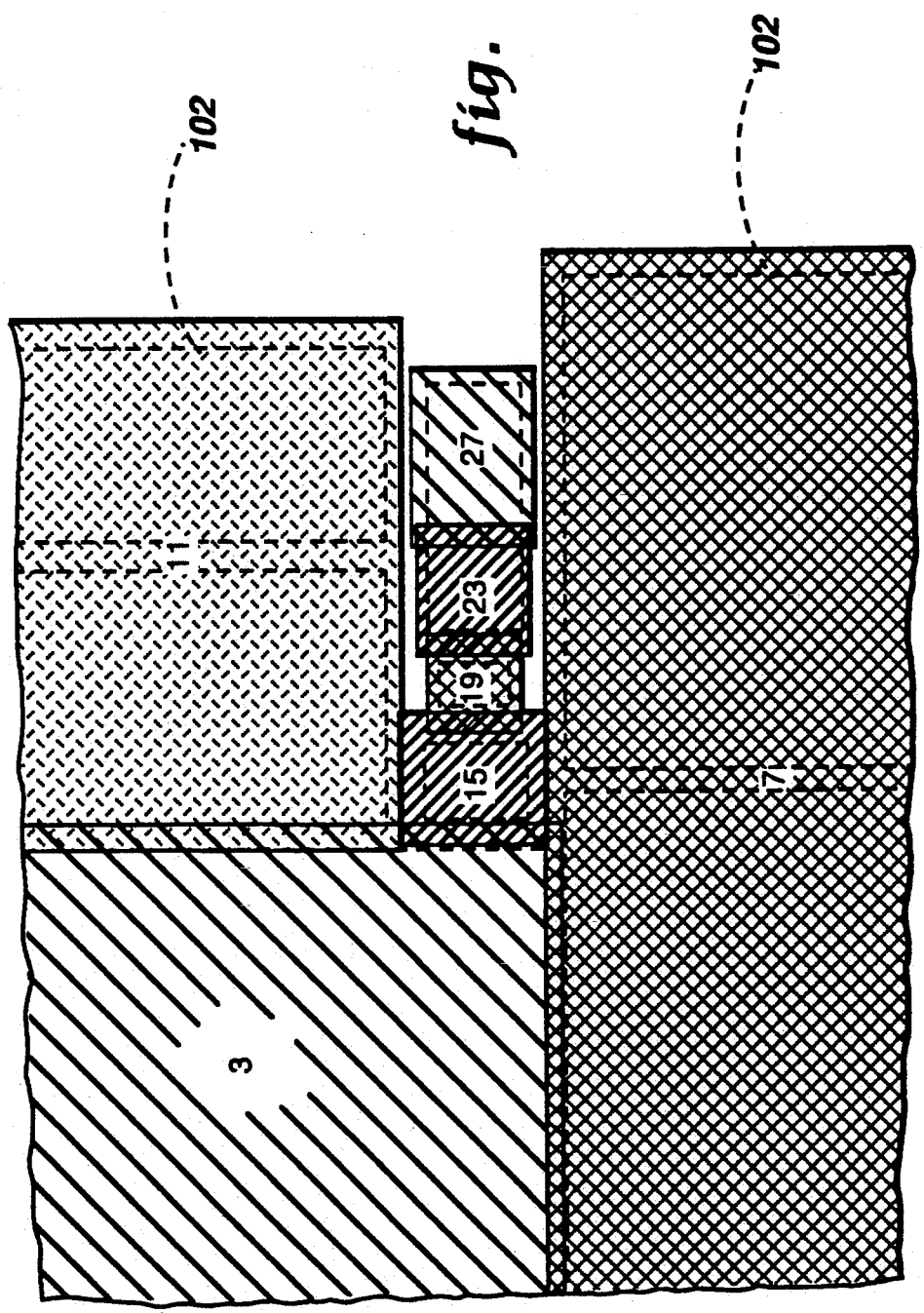
FIG. 8, lined for color, is an enlargement of a portion of FIG. 6, depicting selected cavities prior to a "remove borders" operation.
Figure 9:
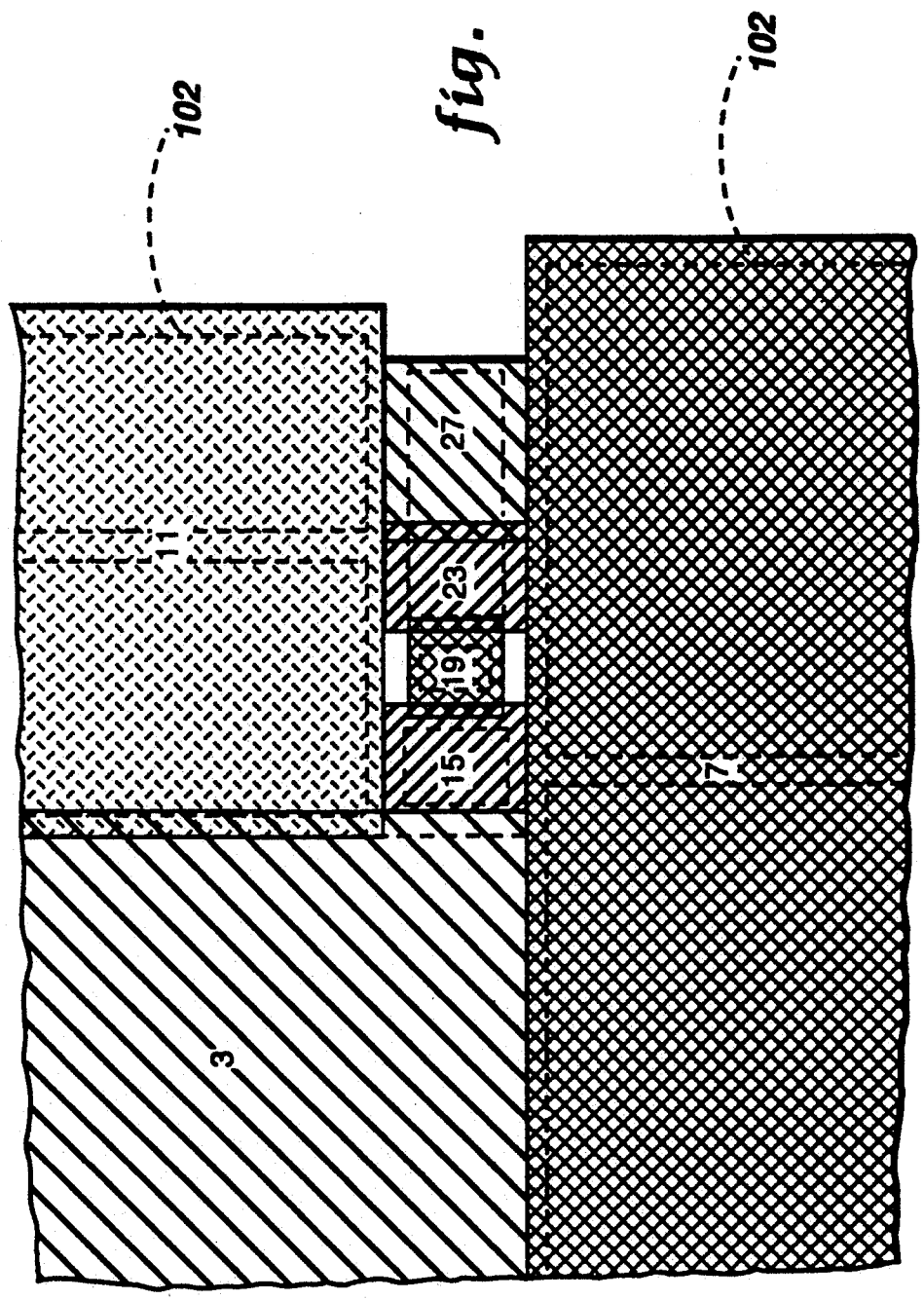
FIG. 9, lined for color, illustrates the results of a "remove borders" operation as applied to the cavities depicted in FIG. 8.

Another operation involved in enhancing the representation to represent locations and dimensions of cavities of the optimized set is a "remove borders" operation (designated "REMOVE BDR" in FIG. 5) whereby walls separating neighboring cavities are selectively removed. In particular, walls having less than a predetermined wall thickness are removed by extending at least one of the cavities to meet another cavity. Usually, the relatively shallower cavity is extended to meet the relatively deeper cavity. FIG. 7 diagrammatically depicts criteria for border removal, while FIGS. 8 and 9 are "before" and "after" representations, respectively, illustrating the "remove borders" operation.

There are two criteria which must be satisfied before borders or walls are removed by adjusting pocket dimensions:

(1) The wall or border between two adjacent cavities must be less than a predetermined minimum thickness specified by the user, for example, 0.2 mm (7.9 mils); and (2) The cavities must be at least partly aligned with each other such that the x or y dimension (depending on the side) of one cavity either partially or fully overlaps that of the other. Thus, unlike the "combine pockets" operation, for the "remove borders" operation alignment between the adjacent cavities need not be exact.

FIG. 7 depicts several arbitrary "A" and "B" pairs of adjacent pockets, illustrating various situations where the foregoing criteria are applied. In FIG. 7, pairs 121, 122, 124, 125 and 127 are candidates for border removal, while pairs 123 and 126 are not, since their x or y dimensions do not overlap.

Referring now in detail to the "before" and "after" border removal depictions of FIGS. 8 and 9, each of these FIGS. is an enlargement generally corresponding to the lower right-hand corner of FIG. 6, showing pockets "15", "19", "23" and "27" of the enhanced set, as well as portions of cavities "3", "7" and "11" of the enhanced set. FIGS. 8 and 9 are lined for color as are FIGS. 4 and 6, with the boundaries of the individual cavities indicated with heavier lines, which would typically be white lines on an on-screen display. FIGS. 8 and 9 also show the dashed-line outlines of the individual chips 102, as described hereinabove with reference to FIG. 3, which outlines would typically be gray lines on an on-screen display. It will be appreciated that combined cavity "11" of the enhanced set contains chips "15" and "19", and combined cavity "7" of the enhanced set contains chips "7" and "11".

In the portion of the layout representation shown in FIG. 8, each of cavities "19", "23" and "27" is a candidate for border removal with reference to cavity "11" above and also with reference to cavity "7" below, in accordance with the criteria described hereinabove. However, the wall or border between cavity "19" and cavity "11" above is thicker than the 0.2 mm (7.9 mil) minimum allowable border width, as is the border or wall between cavity "19" and cavity "7" below. In the case of cavities "23" and "27", the respective walls or borders between each Of these cavities and cavity "11" above is equal to or less than the 0.2 mm (7 .9 mil) minimum border width, as are the walls or borders between cavities "23" and "27" and cavity "7" below.

Accordingly, as shown in the "after" depiction of FIG. 9, cavities "23" and "27" are extended to meet cavities "11" and "7", while cavity "19" remains unchanged. Each of cavities "23" and "27" is shallower than either of the adjacent cavities "11" and "7", as indicated by the on-screen color coding as discussed hereinabove.

Figure 10:
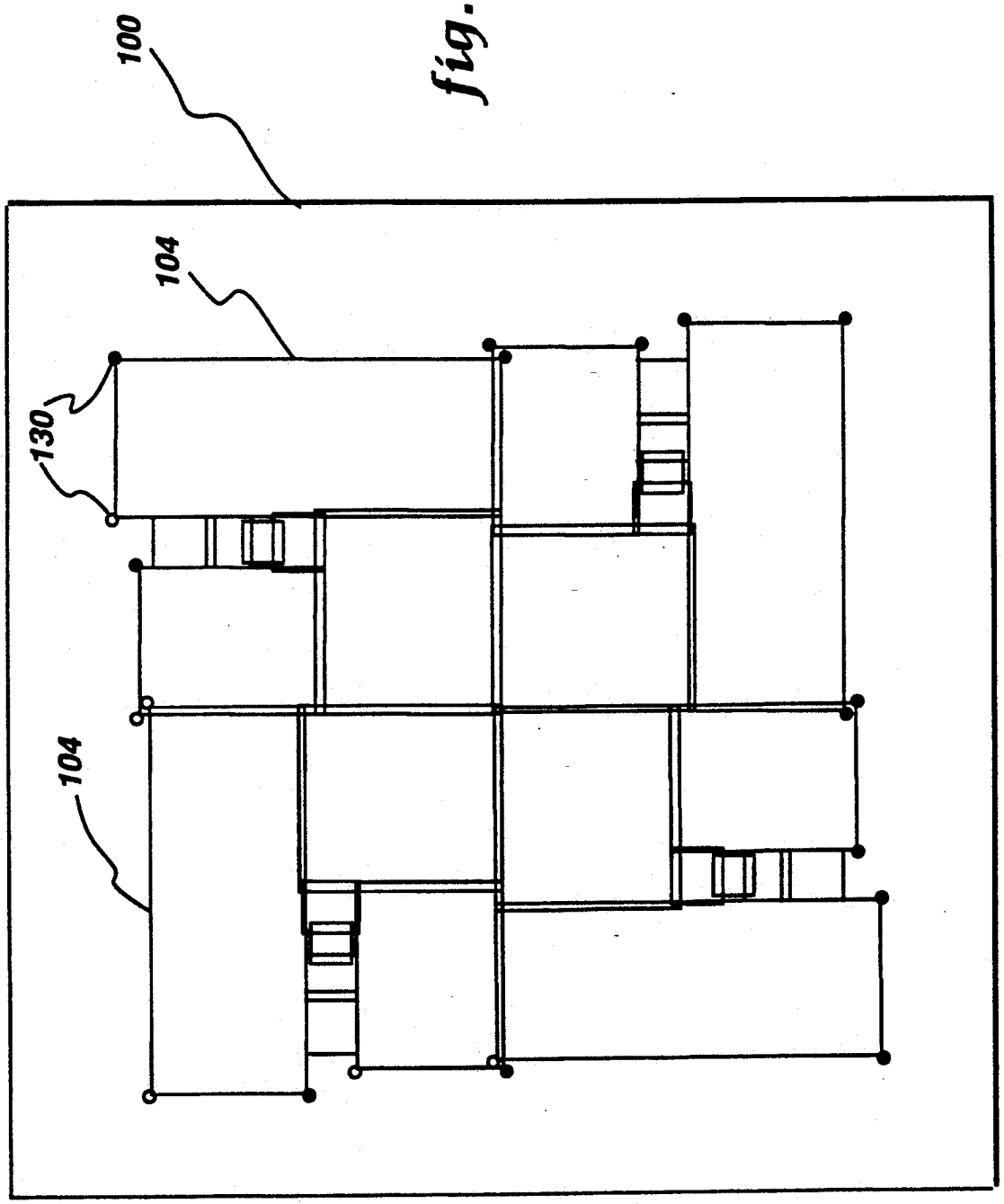
FIG. 10 is an illustration of an on-screen computer display that depicts an operation of providing corner relief in an HDI ceramic substrate.

FIG. 10 represents an on-screen display whereby the user of a program can interactively select cavity corners where relief is to be provided. Corner relief is necessary in some instances because the actual milling tool has a certain minimum radius such that the corners of cavities 104 are not square. Thus, the boundaries of the cavities are slightly extended as indicated by corner relief symbols 130. Where the corner of a relatively deeper pocket overlaps (encroaches) into a relatively shallower pocket, generally corner relief is provided for the relatively deeper pocket.

FIGS. 11–19 are a set of flow charts representing program instructions of a computer program implementing the subject invention, named the "mill" program.

Complete "C" language source code for the "mill" program represented by the flow charts of FIGS. 11–19 is included in the microfiche Appendix hereto. This version of the "mill" program runs on an IBM-PC, with EGA or VGA graphics.

Figure 11:
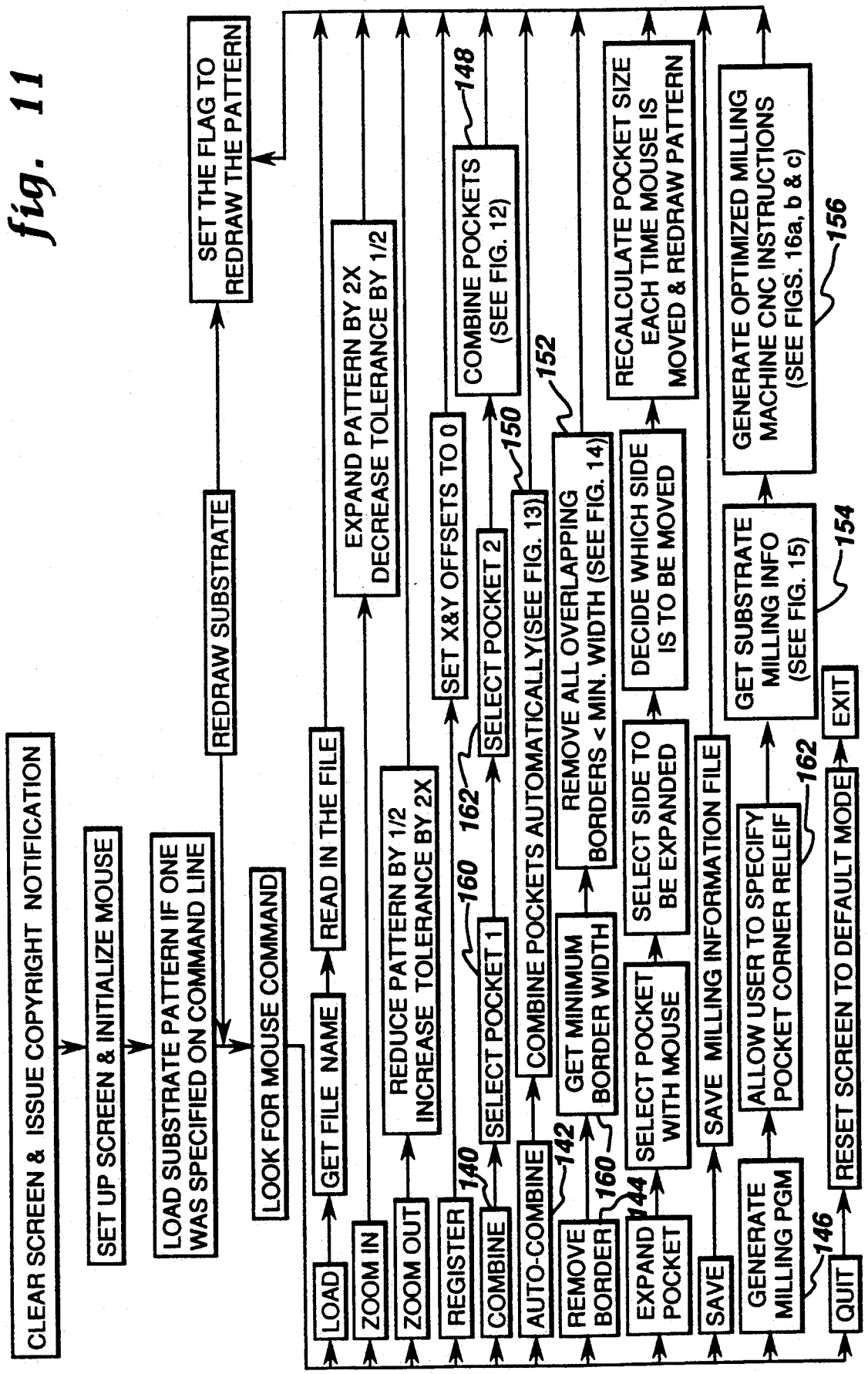
FIG. 11 is a top level flow chart depicting the overall structure of a representative computer program for implementing the subject invention.

FIG. 11 is a top level flow chart depicting the overall structure of the "mill" program. The program begins with initializing and setup steps, and then waits for a mouse command as indicated by a series of steps identified generally along the left edge of the FIG. 11 flow chart generally corresponding to the graphical interface described hereinabove with reference to FIG. 5. Particularly relevant in the context of the present invention and shown in FIG. 11 are the "combine pockets" operation begun at step 140 (manual combine) or step 142 (automatic combine), respectively selected by the "COMBINE" and "AUTOCOMBINE" buttons on the FIG. 5 graphical interface, and the "remove borders" operation, begun at step 144 of FIG. 11, selected by the "REMOVE BDR" button on the graphical interface. The ultimate step of generating CNC program instructions is begun at step 146 of FIG. 11, and is selected by the "CODEGEN" button on the FIG. 5 graphical interface. As indicated by steps 148, 150, 152, 154 and 156, the flow charts of FIGS. 12, 13, 14, 15, 16a, 16b and 16c provide further details of particular operations. The flow charts of FIGS. 17a and 17b, 18 and 19 likewise provide further details of operations indicated in the flow charts of FIGS. 16a, 16b and 16c, respectively.

When the user selects the manual "combine pockets" operation of step 140 of FIG. 11, the user, viewing the onscreen display and based on judgment, at steps 160 and 162 selects two cavities to be combined. At step 148 of FIG. 11, the flow chart of FIG. 12 is referred to for the actual operation of combining the two selected pockets. Alternatively, if the user selects auto combine at step 142 of FIG. 11, the next step 150 refers to the flow chart of FIG. 13 to determine which pockets are to be combined. FIG. 13 in turn refers to the flow chart of FIG. 12 for performing the actual operation of combining the cavities once selected.

Thus, the user may either manually select cavities to combine, or request that the program automatically select and combine any or all cavities which meet the criteria specified hereinabove. If so requested, the program compares each cavity in the data structure represented in APPENDIX A to every other cavity, applying these criteria. If two cavities meet the criteria, then they are combined and the data structure is updated to reflect the combination. Assuming that two cavities arbitrarily designated "A" and "B" are to be combined, the data structure entry for one of the cavities ("A" or "B") is modified, and the other entry is deleted from the data structure after the entry for the combined cavity is updated. (Since the data are stored as a list of data structures, the first entry in the list is retained.)

As indicated by the program flow chart steps of FIG. 12, the cavities are combined in the following manner:

(1) The upper left corner of the combined cavity is set equal to the upper left corner of the leftmost of cavities "A" and "B".

(2) The lower right corner of the combined cavity is set equal to the lower right corner of the rightmost of cavities "A" and "B".

(3) New x and y dimensions (width and height) are calculated from the x and y coordinates of the new upper left and lower right corners, and are supplied into the data structure array to replace the first entry.

(4) The x and y coordinates of the new center of the pocket are calculated and are supplied into the array at the same location.

(5) The depth of the cavity is set equal to the shallower of the depths of cavities "A" and "B".

(6) Other data structure items which depend on these new dimensions are updated.

(7) The list of chips which are included in the resulting cavity is set to the combined lists of chips in cavity "A" and chips in cavity "B".

(8) The second data structure array entry is deleted.

(9) The data structure array entry for each chip in the new combined pocket is updated to place the chip in the new pocket.

When the user selects the "remove borders" operation, as indicated by step 144 in FIG. 11, at step 160 the program prompts the user to enter the minimum border width, which typically will be 0.2 mm (7.9 mils). Then, as indicated by step 152 in FIG. 11, all overlapping borders with less than the minimum width are removed in accordance with the flow chart of FIG. 14, which implements the operations generally described hereinabove.

Figure 15:
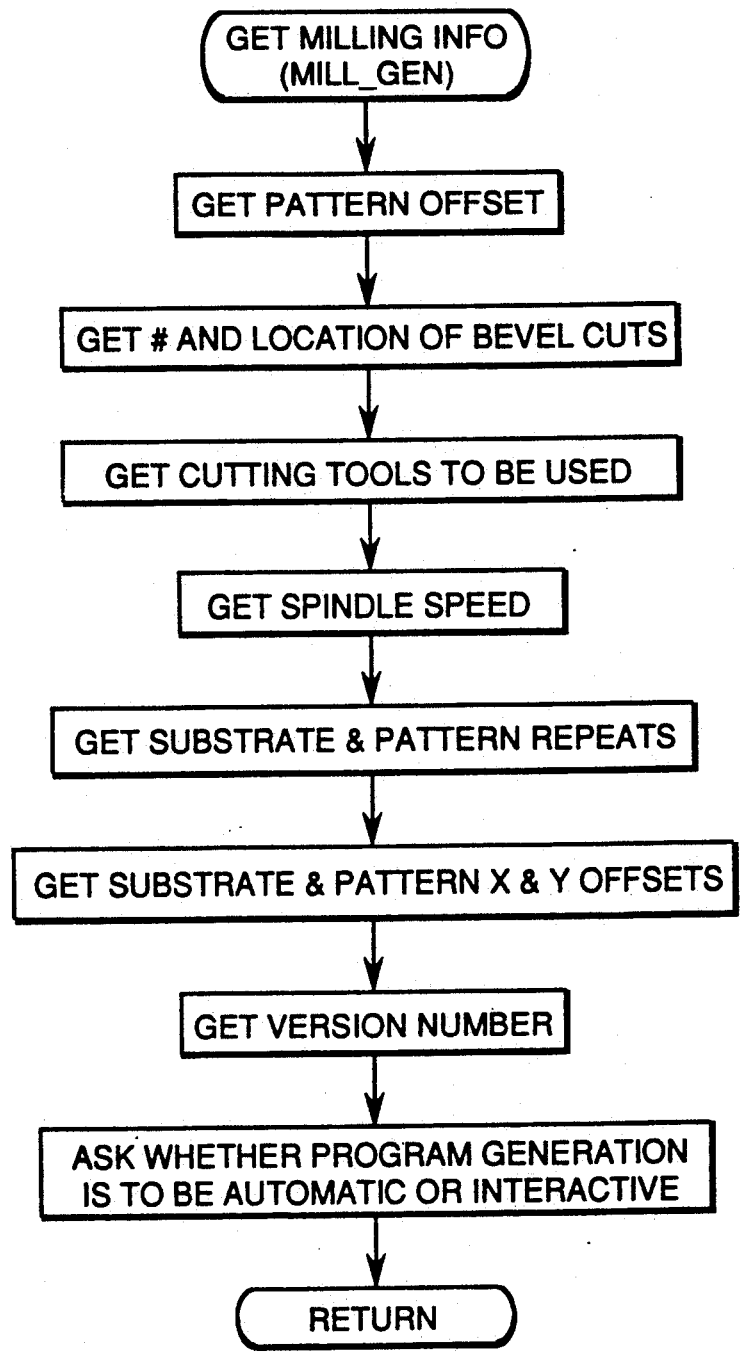
FIG. 15 is a flow chart representing program operations for reading initial information into the program employed in the invention.
Figure 16A:
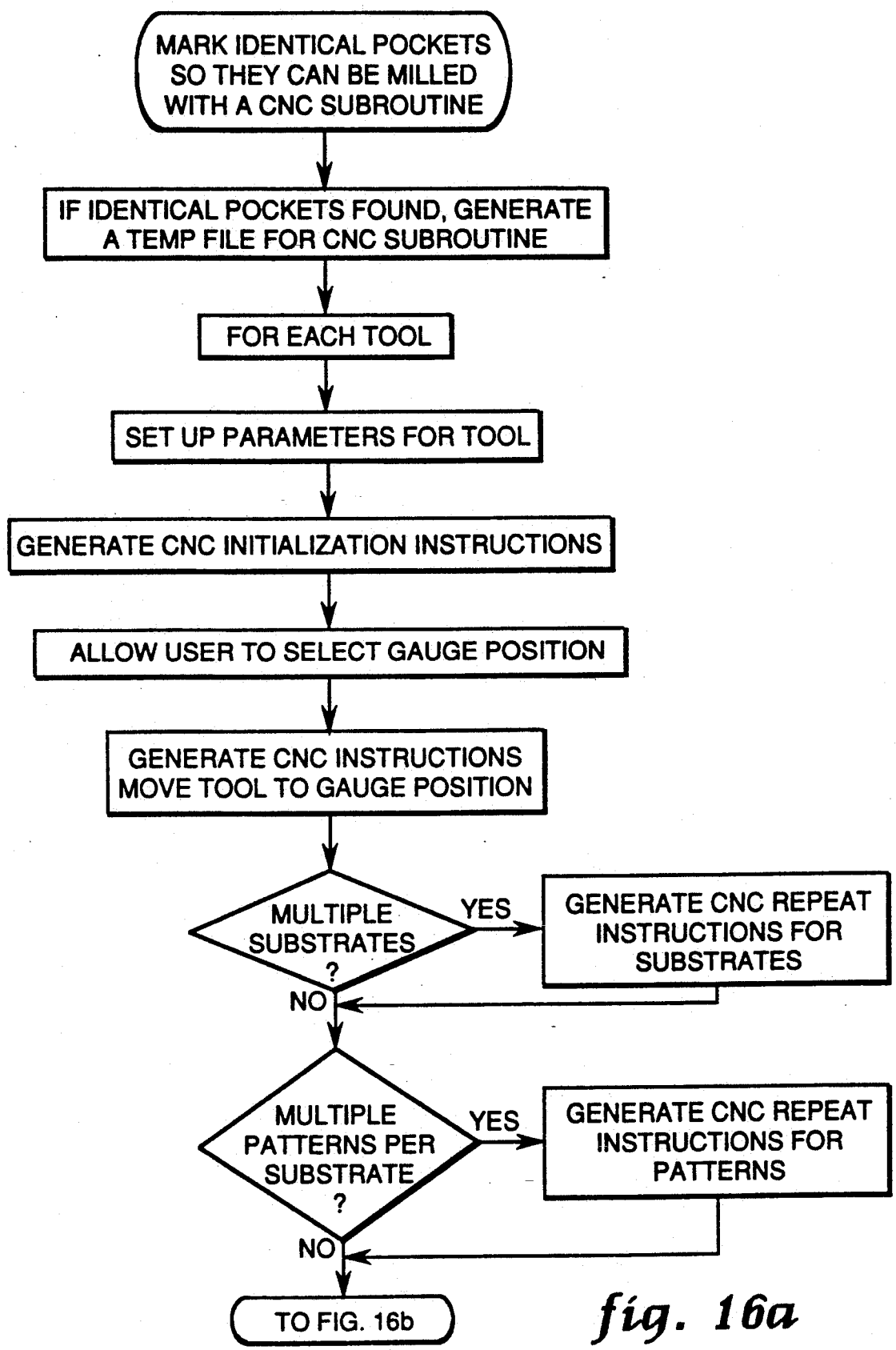
FIGS. 16a, 16b and 16c together comprise a flow chart representing program instructions for generating CNC program instructions for milling the cavities of the optimized set.
Figure 16B:
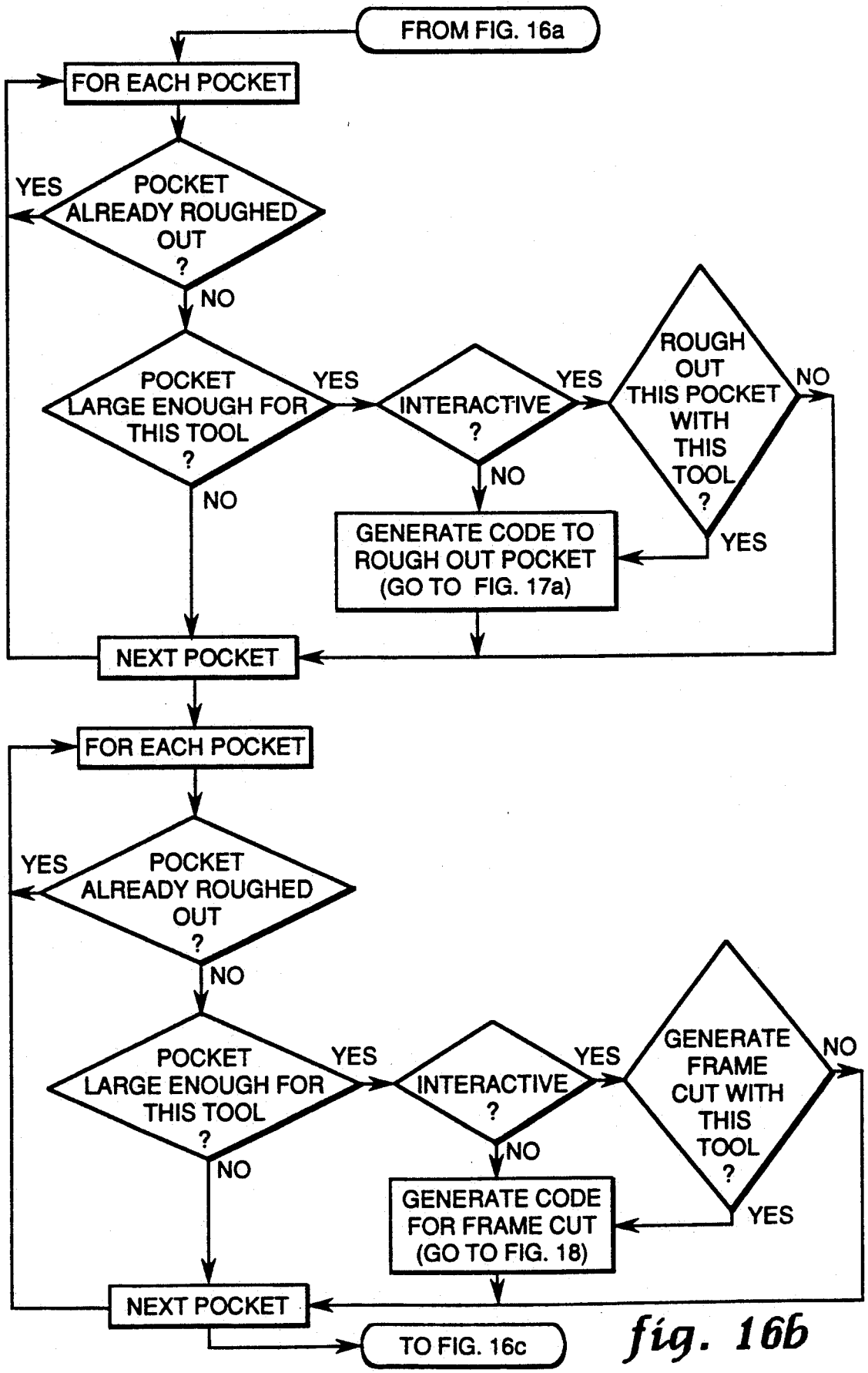
Figure 16C:
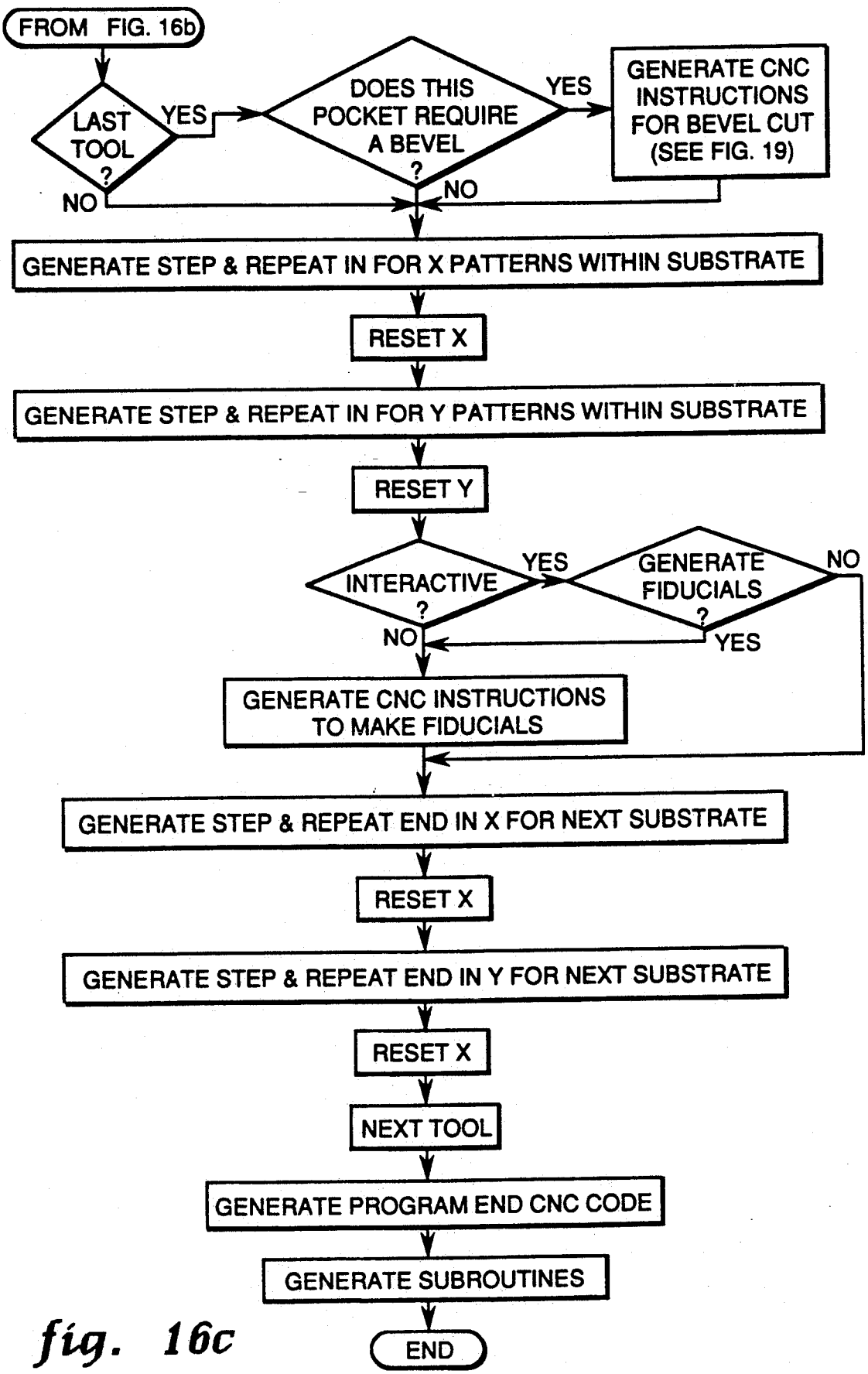
Figure 17A:
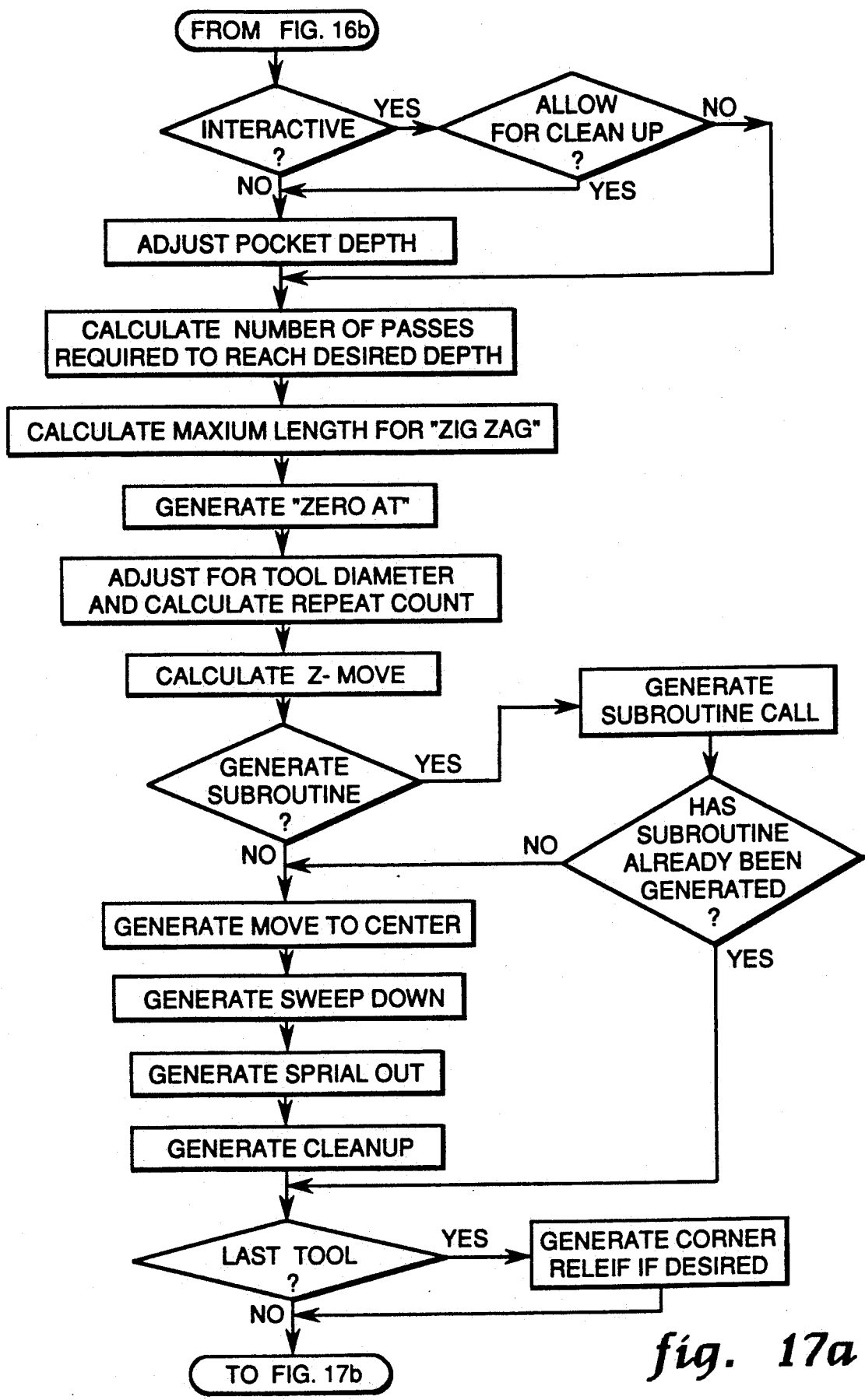
FIGS. 17a and 17b together comprise a flow chart representing program instructions for generating CNC program instructions to rough out a pocket, as called for by program instructions represented by the flow chart of FIG. 16b.
Figure 17B:
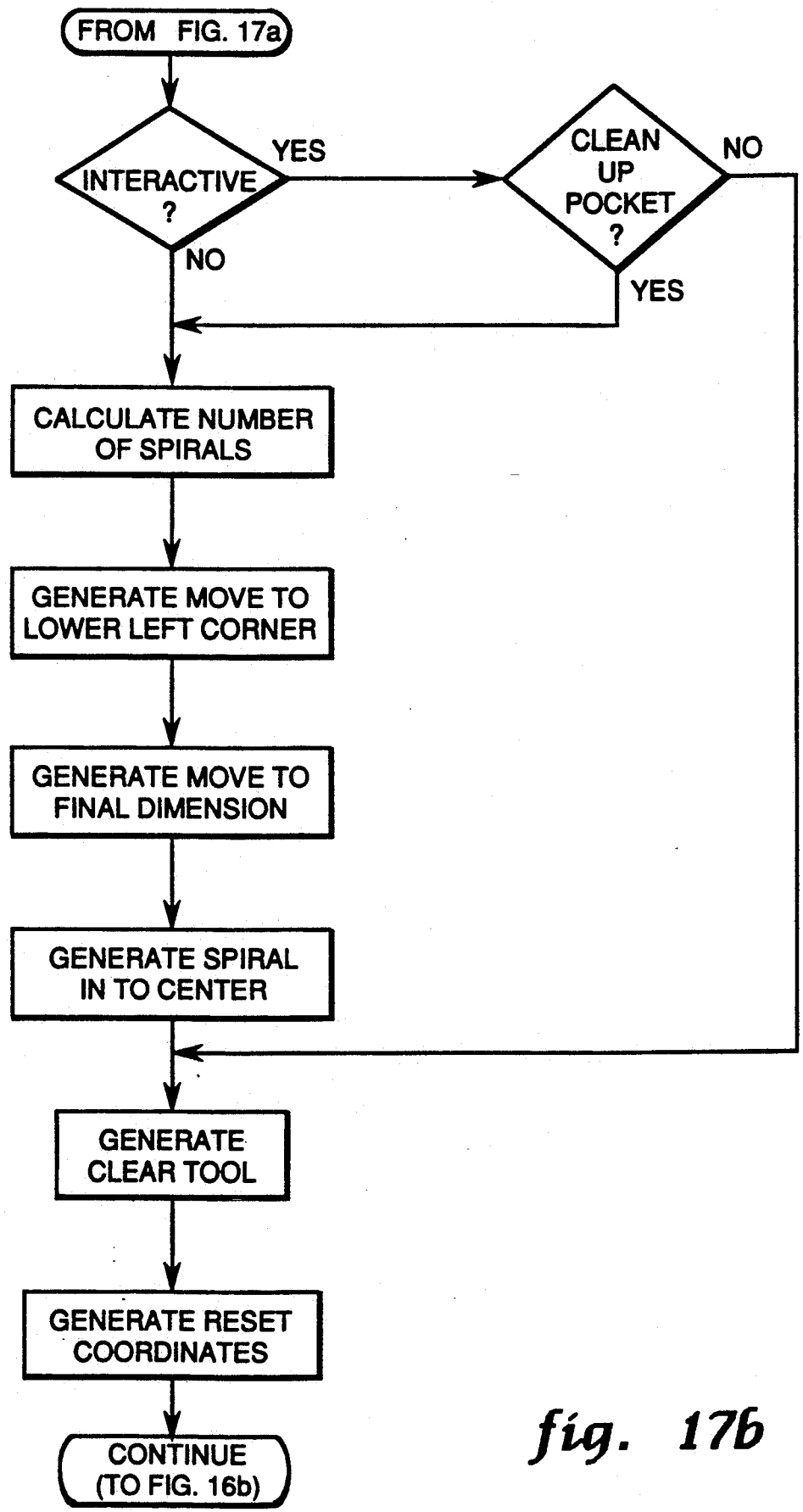
Figure 18:
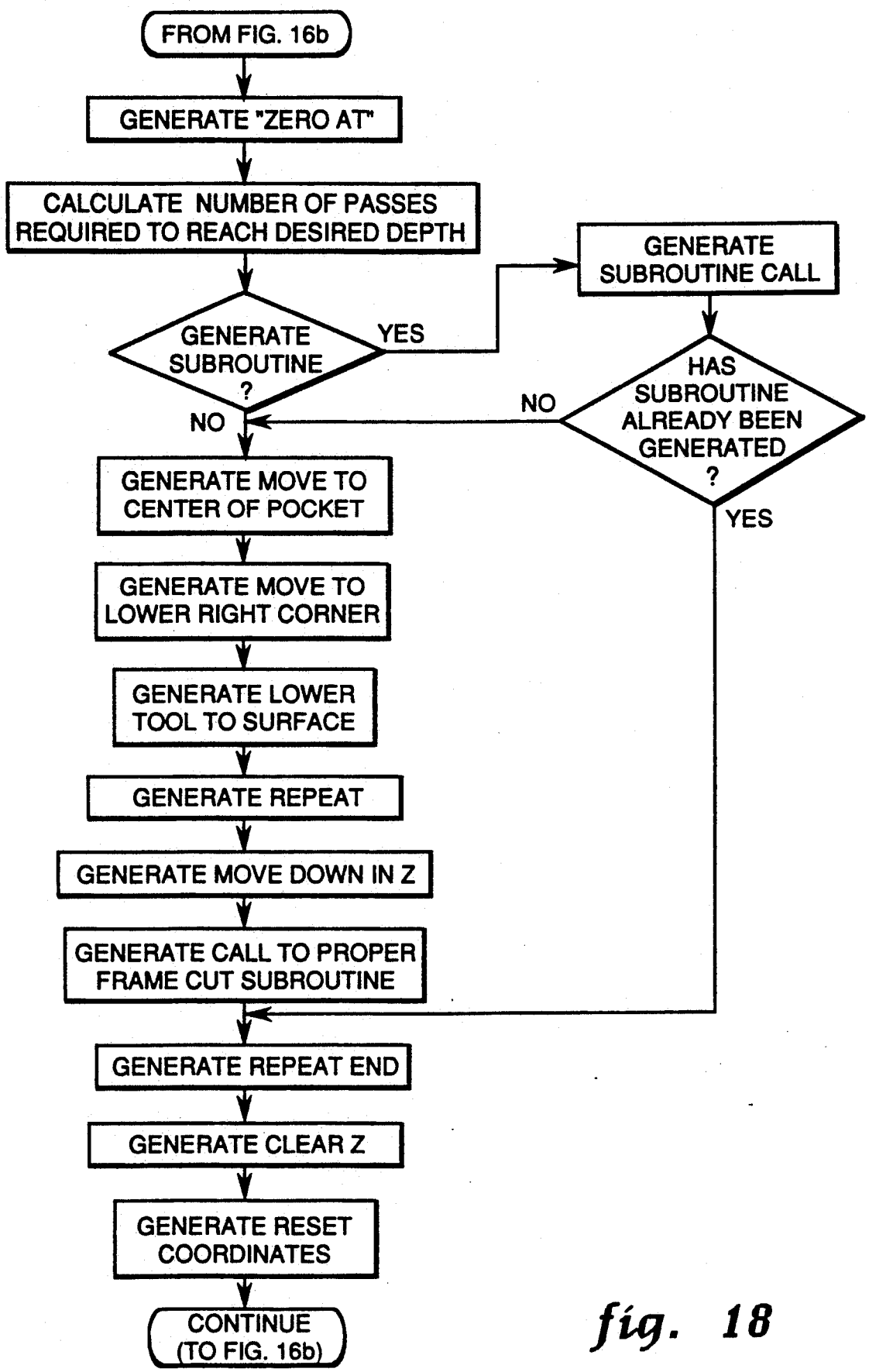
FIG. 18 is a flow chart representing program instructions for generating CNC program instructions for a frame cut, as called by program instructions represented by the flow chart of FIG. 16b.
Figure 19:
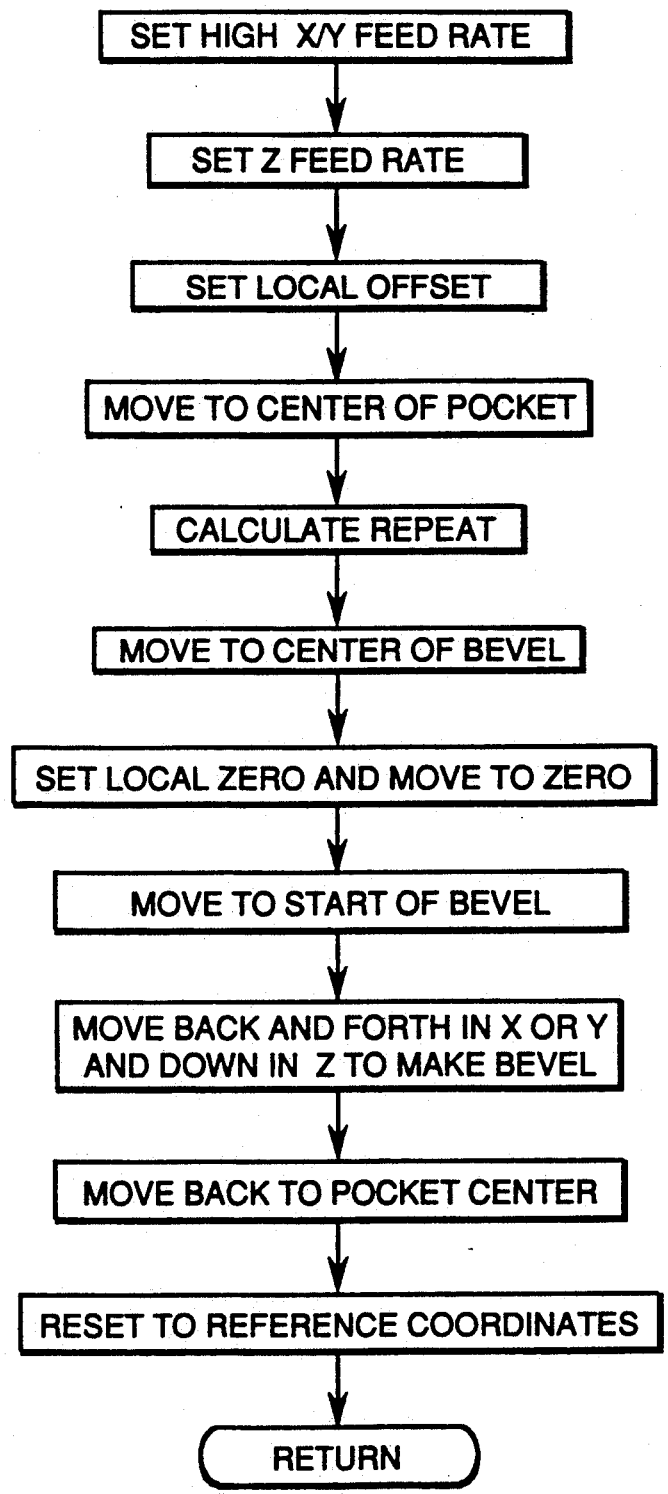
FIG. 19 is a flow Chart representing program instructions for generating CNC program instructions for forming a double cut, as called by program instructions represented the flow chart of FIG. 16c.

To provide useful output information, the final step is to generate CNC program instructions, which is accomplished when the user clicks on the FIG. 5 "CODE-GEN" button, to perform step 146 of FIG. 11. At step 162, the user is allowed to specify pocket corner relief as discussed hereinabove with reference to FIG. 10. Then, at step 154, the program instructions represented by the flow chart of FIG. 15 are executed, whereby various items of information are entered into the program, as indicated.

Finally, as indicated generally at step 156, the actual CNC program instructions are generated.

By way of example, APPENDIX B is a print out of actual CNC program instructions generated by the mill program in the language of the DM2800 CNC milling machine.

FIGS. 16a, 16b, 16c, 17a, 17b, 18 and 19 show the various program operations in generating the actual CNC program instructions in accordance with the invention. Program source code is provided in the microfiche appendix.

The flow charts assume that several milling tools will be used, for example three tools, starting with the tool of relatively largest diameter (e.g. 2.515 mm), then the tool of intermediate diameter (e.g. 1.499 mm), and finishing with tool of relatively smallest diameter (e.g. 0.991 mm). The tools employed are end mills comprising solid steel cylinders, with a diamond abrasive powder coating the cylindrical surface and flat bottom of the tool. As a practical matter, the abrasive powder coating produces a slight edge radius at the lower end of the tool.

In the generated CNC program instructions, a number of techniques are employed to produce an optimum finish when milling ceramic, while minimizing tool wear. For example, when forming a cavity, the tool path is a series of rectangular spirals at increasing depths from the center out (using the CYCLE XY instruction in the particular language of the DM2800 CNC milling machine). This may be referred to as a "spiral out" cut. Conventional practice when milling a rectangular pocket in metal is to specify a tool path which spirals from the outside in. Moreover, the direction of the "spiral out" cut is selected in view of the direction of tool rotation such that cutting debris is directed away from the tool to minimize tool wear.

To provide a smooth bottom finish, there is a final cleanup cut spiraling from the outside in (a "spiral in" cut) at the final depth (z-axis position) of the last "spiral out" cut. This "spiral in" cleanup cut at the final depth is in the opposite direction along a path which is shifted so that each path segment of the final "spiral in" cut straddles two path segments of the previous "spiral out" cut.

Similarly, a frame cut to precisely form the outer boundaries of a given cavity is done as a final step after the cavity itself has basically been formed.

Another technique employed is a "zig-zag" back and forth movement when moving the tool down in the z-axis dimension. In other words, the tool is not simply plunged down to each successive depth.

For more efficient tool movement, cutouts of rectangular cavities are started in the longer direction.

The flow charts assume that several milling tools will be used, for example three tools, starting with the tool of relatively largest diameter (e.g. 2.515 mm), then the tool of intermediate diameter (e.g. 1.499 mm), and finishing with the tool of relatively smallest diameter (e.g. 0.991 mm). The tools are end mills, with a slight edge radius.

While specific embodiments of the invention have been illustrated and described herein, it is realized that numerous modifications and changes will occur to those skilled in the art. It is therefore to be understood that the appended claims are intended to cover all such modifications and the changes as fall within the true spirit and scope of the invention.

APPENDIX A

File: dsp4o.inf

Project = dsp4  Comp file = dsp4.cmp

Substrate size X = 50.815mm  Y = 50.800mm
Zero shift X = 0.000mm  Y = 0.000mm
Fiducials X1 = 1.500mm  Y1 = 1.500mm  Y2 = 49.300mm

| Tool Diameter | Large | Medium | Small | | | |
|---|---|---|---|---|---|---|
| | 2.515mm | 1.499mm | 0.991mm | | | |
| Pocket | Center | | Pocket Dimension | | | #chips |
| 001 | 21.300 | 29.900 | 8.581 | 9.362 | 0.390 | 1 |
| 002 | 20.900 | 21.300 | 9.362 | 8.581 | 0.390 | 1 |
| 003 | 29.500 | 20.900 | 8.581 | 9.362 | 0.390 | 1 |
| 004 | 29.900 | 29.500 | 7.199 | 8.581 | 0.390 | 1 |
| 005 | 12.350 | 37.850 | 9.067 | 7.199 | 0.534 | 1 |
| 006 | 12.950 | 12.350 | 7.199 | 9.067 | 0.534 | 1 |
| 007 | 38.450 | 12.950 | 9.067 | 7.199 | 0.534 | 1 |
| 008 | 37.850 | 38.450 | 7.199 | 9.067 | 0.534 | 1 |
| 009 | 21.050 | 37.850 | 9.067 | 7.199 | 0.534 | 1 |
| 010 | 12.950 | 21.050 | 7.199 | 9.067 | 0.534 | 1 |
| 011 | 29.750 | 12.950 | 9.067 | 7.199 | 0.534 | 1 |
| 012 | 37.850 | 29.750 | 7.199 | 9.067 | 0.534 | 1 |
| 013 | 15.150 | 28.550 | 4.480 | 6.672 | 0.445 | 1 |
| 014 | 22.250 | 15.150 | 6.672 | 4.480 | 0.445 | 1 |
| 015 | 35.650 | 22.250 | 4.480 | 6.672 | 0.445 | 1 |
| 016 | 28.550 | 35.650 | 6.672 | 4.480 | 0.445 | 1 |
| 017 | 11.050 | 28.550 | 4.480 | 6.672 | 0.445 | 1 |
| 018 | 22.250 | 11.050 | 6.672 | 4.480 | 0.445 | 1 |
| 019 | 39.750 | 22.250 | 4.480 | 6.672 | 0.445 | 1 |
| 020 | 28.550 | 39.750 | 6.672 | 4.480 | 0.445 | 1 |
| 021 | 16.300 | 33.050 | 2.098 | 2.477 | 0.282 | 1 |
| 022 | 17.750 | 16.300 | 2.477 | 2.098 | 0.282 | 1 |
| 023 | 34.500 | 17.750 | 2.098 | 2.477 | 0.282 | 1 |
| 024 | 33.050 | 34.500 | 2.477 | 2.098 | 0.282 | 1 |
| 025 | 14.700 | 33.100 | 1.721 | 1.750 | 0.532 | 1 |
| 026 | 17.700 | 14.700 | 1.750 | 1.721 | 0.532 | 1 |
| 027 | 36.100 | 17.700 | 1.721 | 1.750 | 0.532 | 1 |
| 028 | 33.100 | 36.100 | 1.750 | 1.721 | 0.532 | 1 |
| 029 | 13.150 | 33.050 | 2.040 | 2.070 | 0.270 | 1 |
| 030 | 17.750 | 13.150 | 2.070 | 2.040 | 0.270 | 1 |
| 031 | 37.650 | 17.750 | 2.040 | 2.070 | 0.270 | 1 |
| 032 | 33.050 | 37.650 | 2.070 | 2.040 | 0.270 | 1 |
| 033 | 11.000 | 33.050 | 2.931 | 2.219 | 0.391 | 1 |
| 034 | 17.750 | 11.000 | 2.219 | 2.931 | 0.391 | 1 |
| 035 | 39.800 | 17.750 | 2.931 | 2.219 | 0.391 | 1 |
| 036 | 33.050 | 39.800 | 2.219 | 2.931 | 0.391 | 1 |

*****

| Chip # | Name | Rotation | Tool | Center | | Dimension | | | Pocket |
|---|---|---|---|---|---|---|---|---|---|
| 001 | 320C25MPR4 | 4 | 3 | 21.300 | 29.900 | 7.831 | 8.612 | 0.390 | 1 |
| 002 | 320C25MPR1 | 1 | 3 | 20.900 | 21.300 | 8.612 | 7.831 | 0.390 | 2 |
| 003 | 320C25MPR2 | 2 | 3 | 29.500 | 20.900 | 7.831 | 8.612 | 0.390 | 3 |
| 004 | 320C25MPR3 | 3 | 3 | 29.900 | 29.500 | 8.612 | 7.831 | 0.390 | 4 |
| 005 | IDT7133MR1 | 1 | 3 | 12.350 | 37.850 | 8.317 | 6.449 | 0.534 | 5 |
| 006 | IDT7133MR2 | 2 | 3 | 12.950 | 12.350 | 6.449 | 8.317 | 0.534 | 6 |
| 007 | IDT7133MR3 | 3 | 3 | 38.450 | 12.950 | 8.317 | 6.449 | 0.534 | 7 |
| 008 | IDT7133MR4 | 4 | 3 | 37.850 | 38.450 | 6.449 | 8.317 | 0.534 | 8 |
| 009 | IDT7133MR1 | 1 | 3 | 21.050 | 37.850 | 8.317 | 6.449 | 0.534 | 9 |
| 010 | IDT7133MR2 | 2 | 3 | 12.950 | 21.050 | 6.449 | 8.317 | 0.534 | 10 |
| 011 | IDT7133MR3 | 3 | 3 | 29.750 | 12.950 | 8.317 | 6.449 | 0.534 | 11 |
| 012 | IDT7133MR4 | 4 | 3 | 37.850 | 29.750 | 6.449 | 8.317 | 0.534 | 12 |
| 013 | P4C164MPR1 | 1 | 1 | 15.150 | 28.550 | 3.730 | 5.922 | 0.445 | 13 |
| 014 | P4C164MPR2 | 2 | 1 | 22.250 | 15.150 | 5.922 | 3.730 | 0.445 | 14 |
| 015 | P4C164MPR3 | 3 | 1 | 35.650 | 22.250 | 3.730 | 5.922 | 0.445 | 15 |
| 016 | P4C164MPR4 | 4 | 1 | 28.550 | 35.650 | 5.922 | 3.730 | 0.445 | 16 |
| 017 | P4C164MPR1 | 1 | 1 | 11.050 | 28.550 | 3.730 | 5.922 | 0.445 | 17 |
| 018 | P4C164MPR2 | 2 | 1 | 22.250 | 11.050 | 5.922 | 3.730 | 0.445 | 18 |
| 019 | P4C164MPR3 | 3 | 1 | 39.750 | 22.250 | 3.730 | 5.922 | 0.445 | 19 |
| 020 | P4C164MPR4 | 4 | 1 | 28.550 | 39.750 | 5.922 | 3.730 | 0.445 | 20 |
| 021 | 54S139MPR4 | 4 | 0 | 16.300 | 33.050 | 1.348 | 1.727 | 0.282 | 21 |
| 022 | 54S139MPR1 | 1 | 0 | 17.750 | 16.300 | 1.727 | 1.348 | 0.282 | 22 |
| 023 | 54S139MPR2 | 2 | 0 | 34.500 | 17.750 | 1.348 | 1.727 | 0.282 | 23 |
| 024 | 54S139MPR3 | 3 | 0 | 33.050 | 34.500 | 1.727 | 1.348 | 0.282 | 24 |
| 025 | N54SOOMPR1 | 1 | 0 | 14.700 | 33.100 | 0.971 | 1.000 | 0.532 | 25 |
| 026 | N54SOOMPR2 | 2 | 0 | 17.700 | 14.700 | 1.000 | 0.971 | 0.532 | 26 |
| 027 | N54SOOMPR3 | 3 | 0 | 36.100 | 17.700 | 0.971 | 1.000 | 0.532 | 27 |
| 028 | N54SOOMPR4 | 4 | 0 | 33.100 | 36.100 | 1.000 | 0.971 | 0.532 | 28 |
| 029 | 74S132MPR3 | 3 | 0 | 13.150 | 33.050 | 1.290 | 1.320 | 0.270 | 29 |
| 030 | 74S132MPR4 | 4 | 0 | 17.750 | 13.150 | 1.320 | 1.290 | 0.270 | 30 |
| 031 | 74S132MPR1 | 1 | 0 | 37.650 | 17.750 | 1.290 | 1.320 | 0.270 | 31 |
| 032 | 74S132MPR2 | 2 | 0 | 33.050 | 37.650 | 1.320 | 1.290 | 0.270 | 32 |
| 033 | 74LS245MR3 | 3 | 0 | 11.000 | 33.050 | 2.181 | 1.469 | 0.391 | 33 |
| 034 | 74LS245MR4 | 4 | 0 | 17.750 | 11.000 | 1.469 | 2.181 | 0.391 | 34 |
| 035 | 74LS245MR1 | 1 | 0 | 39.800 | 17.750 | 2.181 | 1.469 | 0.391 | 35 |
| 036 | 74LS245MR2 | 2 | 0 | 33.050 | 39.800 | 1.469 | 2.181 | 0.391 | 36 |

APPENDIX B

```
005 START mm   01
006  TD=    2.515
007 F XY =  10.0
008 F  Z =   0.5
009 CALL SUB   01
010 SETUP >zcxyu
011 HALT
012 CALL SUB   02
013 GOfX  25.400
014 GOfY  25.400
015 CALL SUB   08
016 SP= 0000 RPM
017 SPINDLE   OFF
018 GOfZ  70.000
019 GOfX   0.000
020 GOfY   0.000
021
022
023 ZERO AT
024    X  29.900
025    Y  29.500
026 CALL SUB   50
027 GOfZ  70.000
028 >REF COODS
029
030 ZERO AT
031    X  29.500
032    Y  20.900
033 CALL SUB   51
034 GOfZ  70.000
035 >REF COODS
036
037 ZERO AT
038    X  20.900
039    Y  21.300
040 GOfX   0.000
041 GOfY   0.000
042 GOfZ-  3.000
043 GO Z-  3.175
044 REPEAT     04
045 GO X-  3.448
046 GR X   6.897
047    Z-  0.048
048 GR X-  6.897
049    Z-  0.048
050 GR X   6.897
051 GR X-  6.897
052 GO X   0.391
053 GO Y-  0.000
054 REPEAT     04
055 GR X   0.755
056 GR Y-  0.755
057 CYCLE XY
058 REPEAT END
059 GO X   3.448
060 GO Y-  3.058
061 CYCLE XY
062 GO X   0.000
063 GO Y   0.000
064 REPEAT END
065 GOfZ  70.000
066 >REF COODS
067
068 ZERO AT
069    X  21.300
070    Y  29.900
071 GOfX   0.000
072 GOfY   0.000
073 GOfZ-  3.000
074 GO Z-  3.175
075 REPEAT     04
076 GO Y-  3.448
077 GR Y   6.897
078    Z-  0.048
079 GR Y-  6.897
080    Z-  0.048
081 GR Y   6.897
082 GR Y-  6.897
083 GO X   0.000
084 GO Y-  0.391
085 REPEAT     04
086 GR X   0.755
087 GR Y-  0.755
088 CYCLE XY
089 REPEAT END
090 GO X   3.058
091 GO Y-  3.448
092 CYCLE XY
093 GO X   0.000
094 GO Y   0.000
095 REPEAT END
096 GOfZ  70.000
097 >REF COODS
098
099 ZERO AT
100    X  37.850
101    Y  34.100
102 CALL SUB   52
103 GOfZ  70.000
104 >REF COODS
105
106 ZERO AT
107    X  34.100
108    Y  12.950
109 CALL SUB   53
110 GOfZ  70.000
111 >REF COODS
112
113 ZERO AT
114    X  12.950
115    Y  16.700
116 GOfX   0.000
117 GOfY   0.000
118 GOfZ-  3.000
119 GO Z-  3.175
120 REPEAT     05
121 GO Y-  7.651
122 GR Y  15.302
123    Z-  0.053
124 GR Y- 15.302
125    Z-  0.053
126 GR Y  15.302
127 GR Y- 15.302
128 GO X   0.000
129 GO Y-  5.284
130 REPEAT     03
131 GR X   0.755
132 GR Y-  0.755
133 CYCLE XY
134 REPEAT END
135 GO X   2.367
136 GO Y-  7.651
137 CYCLE XY
138 GO X   0.000
139 GO Y   0.000
140 REPEAT END
141 GOfZ  70.000
142 >REF COODS
143
144 ZERO AT
145    X  16.700
146    Y  37.850
147 GOfX   0.000
148 GOfY   0.000
```

```
149 GOfZ-   3.000
150 GO  Z-  3.175
151 REPEAT     05
152 GO  X-  7.651
153 GR  X  15.302
154     Z-  0.053
155 GR  X- 15.302
156     Z-  0.053
157 GR  X  15.302
158 GR  X- 15.302
159 GO  X   5.284
160 GO  Y-  0.000
161 REPEAT     03
162 GR  X   0.755
163 GR  Y-  0.755
164 CYCLE  XY
165 REPEAT  END
166 GO  X   7.651
167 GO  Y-  2.367
168 CYCLE  XY
169 GO  X   0.000
170 GO  Y   0.000
171 REPEAT  END
172 GOfZ  70.000
173 >REF  COODS
174
175 ZERO  AT
176     X  28.550
177     Y  37.700
178 CALL  SUB   54
179 GOfZ  70.000
180 >REF  COODS
181
182 ZERO  AT
183     X  37.700
184     Y  22.250
185 CALL  SUB   55
186 GOfZ  70.000
187 >REF  COODS
188
189 ZERO  AT
190     X  22.250
191     Y  13.100
192 GOfX   0.000
193 GOfY   0.000
194 GOfZ-  3.000
195 GO  Z-  3.175
196 REPEAT     04
197 GO  Y-  3.057
198 GR  Y   6.115
199     Z-  0.055
200 GR  Y-  6.115
201     Z-  0.055
202 GR  Y   6.115
203 GR  Y-  6.115
204 GO  X   0.000
205 GO  Y-  0.954
206 REPEAT     02
207 GR  X   0.755
208 GR  Y-  0.755
209 CYCLE  XY
210 REPEAT  END
211 GO  X   2.104
212 GO  Y-  3.057
213 CYCLE  XY
214 GO  X   0.000
215 GO  Y   0.000
216 REPEAT  END
217 GOfZ  70.000
218 >REF  COODS
219
220 ZERO  AT
221     X  13.100
222     Y  28.550
223 GOfX   0.000
224 GOfY   0.000
225 GOfZ-  3.000
226 GO  Z-  3.175
227 REPEAT     04
228 GO  X-  3.057
229 GR  X   6.115
230     Z-  0.055
231 GR  X-  6.115
232     Z-  0.055
233 GR  X   6.115
234 GR  X-  6.115
235 GO  X   0.954
236 GO  Y-  0.000
237 REPEAT     02
238 GR  X   0.755
239 GR  Y-  0.755
240 CYCLE  XY
241 REPEAT  END
242 GO  X   3.057
243 GO  Y-  2.104
244 CYCLE  XY
245 GO  X   0.000
246 GO  Y   0.000
247 REPEAT  END
248 GOfZ  70.000
249 >REF  COODS
250
251 SPINDLE  OFF
252 HALT
253 TD=   0.991
254 F XY =   4.5
255 F  Z =   0.5
256 CALL  SUB   01
257 SETUP  >zcxyu
258 HALT
259 CALL  SUB   02
260 GOfX  25.400
261 GOfY  25.400
262 CALL  SUB   08
263 SP=  0000 RPM
264 SPINDLE   OFF
265 GOfZ  70.000
266 GOfX   0.000
267 GOfY   0.000
268
269
270 ZERO  AT
271     X  29.900
272     Y  29.500
273 CALL  SUB   56
274 GR  X   0.508
275     Y-  0.508
276 C-SIGN   X
277 REPEAT     20
278 GR  X   0.198
279 GR  Y   0.198
280 CYCLE  XY
281 REPEAT  END
282 GOfZ  70.000
283 GO  X   0.000
284 GO  Y   0.000
285 >REF  COODS
286
287 ZERO  AT
288     X  29.500
289     Y  20.900
290 CALL  SUB   57
291 GR  X   0.508
292     Y-  0.508
293 C-SIGN   X
294 REPEAT     20
295 GR  X   0.198
296 GR  Y   0.198
297 CYCLE  XY
298 REPEAT  END
299 GOfZ  70.000
300 GO  X   0.000
301 GO  Y   0.000
302 >REF  COODS
303
304 ZERO  AT
```

```
305     X   20.900
306     Y   21.300
307 GOfX    0.000
308 GOfY    0.000
309 GOfX    3.702
310     Y-  3.312
311 GOfZ-  3.000
312 GO  Z- 3.175
313 REPEAT     04
314 GR Z-  0.097
315 GR X   0.508
316     Y- 0.508
317 C-SIGN  X
318 C-SIGN  Y
319 CALL SUB  13
320 C-SIGN  X
321 C-SIGN  Y
322 GR X-  0.508
323     Y  0.508
324 REPEAT END
325 GR X   0.508
326     Y- 0.508
327 C-SIGN  X
328 REPEAT     20
329 GR X   0.198
330 GR Y   0.198
331 CYCLE XY
332 REPEAT END
333 GOfZ  70.000
334 GO X   0.000
335 GO Y   0.000
336 >REF COODS
337
338 ZERO AT
339     X   21.300
340     Y   29.900
341 GOfX    0.000
342 GOfy    0.000
343 GOfX    3.312
344     Y-  3.702
345 GOfZ-  3.000
346 GO Z-  3.175
347 REPEAT     04
348 GR Z-  0.097
349 GR X   0.508
350     Y- 0.508
351 C-SIGN  X
352 CALL SUB  12
353 C-SIGN  Y
354 C-SIGN  X
355 CALL SUB  14
356 C-SIGN  Y
357 GR X-  0.508
358     Y  0.508
359 REPEAT END
360 GR X   0.508
361     Y- 0.508
362 C-SIGN  X
363 REPEAT     20
364 GR X   0.198
365 GR Y   0.198
366 CYCLE XY
367 REPEAT END
368 GOfZ  70.000
369 GO X   0.000
370 GO Y   0.000
371 >REF COODS
372
373 ZERO AT
374     X   37.850
375     Y   34.100
376 CALL SUB  58
377 GR X   0.508
378     Y- 0.508
379 C-SIGN  X
380 REPEAT     16
381 GR X   0.198
382 GR Y   0.198
383 CYCLE XY
384 REPEAT END
385 GOfZ  70.000
386 GO X   0.000
387 GO Y   0.000
388 >REF COODS
389
390 ZERO AT
391     X   34.100
392     Y   12.950
393 CALL SUB  59
394 GR X   0.508
395     Y- 0.508
396 C-SIGN  X
397 REPEAT     16
398 GR X   0.198
399 GR Y   0.198
400 CYCLE XY
401 REPEAT END
402 GOfZ  70.000
403 GO X   0.000
404 GO Y   0.000
405 >REF COODS
406
407 ZERO AT
408     X   12.950
409     Y   16.700
410 GOfX    0.000
411 GOfY    0.000
412 GOfX    2.621
413     Y-  7.905
414 GOfZ-  3.000
415 GO Z-  3.175
416 REPEAT     05
417 GR Z-  0.107
418 CALL SUB  09
419 REPEAT END
420 GR X   0.508
421     Y- 0.508
422 C-SIGN  X
423 REPEAT     16
424 GR X   0.198
425 GR Y   0.198
426 CYCLE XY
427 REPEAT END
428 GOfZ  70.000
429 GO X   0.000
430 GO Y   0.000
431 >REF COODS
432
433 ZERO AT
434     X   16.700
435     Y   37.850
436 GOfX    0.000
437 GOfy    0.000
438 GOfX    7.905
439     Y-  2.621
440 GOfZ-  3.000
441 GO Z-  3.175
442 REPEAT     05
443 GR Z-  0.107
444 CALL SUB  09
445 REPEAT END
446 GR X   0.508
447     Y- 0.508
448 C-SIGN  X
449 REPEAT     16
450 GR X   0.198
451 GR Y   0.198
452 CYCLE XY
453 REPEAT END
454 GOfZ  70.000
455 GO X   0.000
456 GO Y   0.000
457 >REF COODS
458
459 ZERO AT
460     X   28.550
```

```
461     Y    37.700
462 CALL SUB   60
463 GR X    0.508
464     Y-   0.508
465 C-SIGN  X
466 REPEAT     15
467 GR X    0.198
468 GR Y    0.198
469 CYCLE XY
470 REPEAT END
471 GOfZ   70.000
472 GO X    0.000
473 GO Y    0.000
474 >REF COODS
475
476 ZERO AT
477     X   37.700
478     Y   22.250
479 CALL SUB   61
480 GR X    0.508
481     Y-   0.508
482 C-SIGN  X
483 REPEAT     15
484 GR X    0.198
485 GR Y    0.198
486 CYCLE XY
487 REPEAT END
488 GOfZ   70.000
489 GO X    0.000
490 GO Y    0.000
491 >REF COODS
492
493 ZERO AT
494     X   22.250
495     Y   13.100
496 GOfX    0.000
497 GOfY    0.000
498 GOfX    2.358
499     Y-   3.311
500 GOfZ-   3.000
501 GO Z-   3.175
502 REPEAT     04
503 GR Z-   0.111
504 CALL SUB   09
505 REPEAT END
506 GR X    0.508
507     Y-   0.508
508 C-SIGN  X
509 REPEAT     15
510 GR X    0.198
511 GR Y    0.198
512 CYCLE XY
513 REPEAT END
514 GOfZ   70.000
515 GO X    0.000
516 GO Y    0.000
517 >REF COODS
518
519 ZERO AT
520     X   13.100
521     Y   28.550
522 GOfX    0.000
523 GOfY    0.000
524 GOfX    3.311
525     Y-   2.358
526 GOfZ-   3.000
527 GO Z-   3.175
528 REPEAT     04
529 GR Z-   0.111
530 CALL SUB   09
531 REPEAT END
532 GR X    0.508
533     Y-   0.508
534 C-SIGN  X
535 REPEAT     15
536 GR X    0.198
537 GR Y    0.198
538 CYCLE XY
539 REPEAT END
540 GOfZ   70.000
541 GO X    0.000
542 GO Y    0.000
543 >REF COODS
544
545 ZERO AT
546     X   33.050
547     Y   34.500
548 CALL SUB   62
549 GOfZ   70.000
550 >REF COODS
551
552 ZERO AT
553     X   34.500
554     Y   17.750
555 CALL SUB   63
556 GOfZ   70.000
557 >REF COODS
558
559 ZERO AT
560     X   17.750
561     Y   16.300
562 GOfX    0.000
563 GOfY    0.000
564 GOfZ-   3.000
565 GO Z-   3.175
566 REPEAT     03
567 GO X-   0.768
568 GR X    1.536
569     Z-   0.046
570 GR X-   1.536
571     Z-   0.046
572 GR X    1.536
573 GR X-   1.536
574 GO X    0.189
575 GO Y-   0.000
576 REPEAT     02
577 GR X    0.198
578 GR Y-   0.198
579 CYCLE XY
580 REPEAT END
581 GO X    0.768
582 GO Y-   0.579
583 CYCLE XY
584 C-SIGN  X
585 CALL SUB   12
586 C-SIGN  Y
587 C-SIGN  X
588 C-SIGN  Y
589 GO X    0.000
590 GO Y    0.000
591 REPEAT END
592 GOfZ   70.000
593 >REF COODS
594
595 ZERO AT
596     X   16.300
597     Y   33.050
598 GOfX    0.000
599 GOfY    0.000
600 GOfZ-   3.000
601 GO Z-   3.175
602 REPEAT     03
603 GO Y-   0.768
604 GR Y    1.536
605     Z-   0.046
606 GR Y-   1.536
607     Z-   0.046
608 GR Y    1.536
609 GR Y-   1.536
610 GO X    0.000
611 GO Y-   0.189
612 REPEAT     02
613 GR X    0.198
614 GR Y-   0.198
615 CYCLE XY
616 REPEAT END
```

```
617 GO  X    0.579
618 GO  Y-   0.768
619 CYCLE XY
620 CALL SUB   11
621 C-SIGN   X
622 C-SIGN   Y
623 C-SIGN   X
624 C-SIGN   Y
625 GO  X    0.000
626 GO  Y    0.000
627 REPEAT END
628 GOfZ    70.000
629 >REF COODS
630
631 ZERO AT
632     X   33.100
633     Y   36.100
634 CALL SUB   64
635 GOfZ    70.000
636 >REF COODS
637
638 ZERO AT
639     X   36.100
640     Y   17.700
641 CALL SUB   65
642 GOfZ    70.000
643 >REF COODS
644
645 ZERO AT
646     X   17.700
647     Y   14.700
648 GOfX     0.000
649 GOfY     0.000
650 GOfZ-    3.000
651 GO  Z-   3.175
652 REPEAT      05
653 GO  X-   0.404
654 GR  X    0.809
655     Z-   0.053
656 GR  X-   0.809
657     Z-   0.053
658 GR  X    0.809
659 GR  X-   0.809
660 GO  X    0.014
661 GO  Y-   0.000
662 GR  X    0.198
663 GR  Y-   0.198
664 CYCLE XY
665 GO  X    0.404
666 GO  Y-   0.390
667 CYCLE XY
668 GO  X    0.000
669 GO  Y    0.000
670 REPEAT END
671 GOfZ    70.000
672 >REF COODS
673
674 ZERO AT
675     X   14.700
676     Y   33.100
677 GOfX     0.000
678 GOfY     0.000
679 GOfZ-    3.000
680 GO  Z-   3.175
681 REPEAT      05
682 GO  Y-   0.404
683 GR  Y    0.809
684     Z-   0.053
685 GR  Y-   0.809
686     Z-   0.053
687 GR  Y    0.809
688 GR  Y-   0.809
689 GO  X    0.000
690 GO  Y-   0.014
691 GR  X    0.198
692 GR  Y-   0.198
693 CYCLE XY
694 GO  X    0.390
695 GO  Y-   0.404
696 CYCLE XY
697 GO  X    0.000
698 GO  Y    0.000
699 REPEAT END
700 GOfZ    70.000
701 >REF COODS
702
703 ZERO AT
704     X   33.050
705     Y   37.650
706 GOfX     0.000
707 GOfY     0.000
708 GOfZ-    3.000
709 GO  Z-   3.175
710 REPEAT      03
711 GO  X-   0.564
712 GR  X    1.129
713     Z-   0.044
714 GR  X-   1.129
715     Z-   0.044
716 GR  X    1.129
717 GR  X-   1.129
718 GO  X    0.015
719 GO  Y-   0.000
720 REPEAT      02
721 GR  X    0.198
722 GR  Y-   0.198
723 CYCLE XY
724 REPEAT END
725 GO  X    0.564
726 GO  Y-   0.549
727 CYCLE XY
728 GO  X    0.000
729 GO  Y    0.000
730 REPEAT END
731 GOfZ    70.000
732 >REF COODS
733
734 ZERO AT
735     X   37.650
736     Y   17.750
737 GOfX     0.000
738 GOfY     0.000
739 GOfZ-    3.000
740 GO  Z-   3.175
741 REPEAT      03
742 GO  Y-   0.564
743 GR  Y    1.129
744     Z-   0.044
745 GR  Y-   1.129
746     Z-   0.044
747 GR  Y    1.129
748 GR  Y-   1.129
749 GO  X    0.000
750 GO  Y-   0.015
751 REPEAT      02
752 GR  X    0.198
753 GR  Y-   0.198
754 CYCLE XY
755 REPEAT END
756 GO  X    0.549
757 GO  Y-   0.564
758 CYCLE XY
759 GO  X    0.000
760 GO  Y    0.000
761 REPEAT END
762 GOfZ    70.000
763 >REF COODS
764
765 ZERO AT
766     X   17.750
767     Y   13.150
768 GOfX     0.000
769 GOfY     0.000
770 GOfZ-    3.000
771 GO  Z-   3.175
772 REPEAT      03
```

```
773 GO  X-   0.564
774 GR X    1.129
775    Z-   0.044
776 GR X-   1.129
777    Z-   0.044
778 GR X    1.129
779 GR X-   1.129
780 GO X    0.015
781 GO Y-   0.000
782 REPEAT      02
783 GR X    0.198
784 GR Y-   0.198
785 CYCLE XY
786 REPEAT END
787 GO X    0.564
788 GO Y-   0.549
789 CYCLE XY
790 GO X    0.000
791 GO Y    0.000
792 REPEAT END
793 GOfZ   70.000
794 >REF COODS
795
796 ZERO AT
797    X   13.150
798    Y   33.050
799 GOfX   0.000
800 GOfY   0.000
801 GOfZ-  3.000
802 GO Z-  3.175
803 REPEAT      03
804 GO Y-   0.564
805 GR Y    1.129
806    Z-   0.044
807 GR Y-   1.129
808    Z-   0.044
809 GR Y    1.129
810 GR Y-   1.129
811 GO X    0.000
812 GO Y-   0.015
813 REPEAT      02
814 GR X    0.198
815 GR Y-   0.198
816 CYCLE XY
817 REPEAT END
818 GO X    0.549
819 GO Y-   0.564
820 CYCLE XY
821 GO X    0.000
822 GO Y    0.000
823 REPEAT END
824 GOfZ   70.000

825 >REF COODS
826
827 ZERO AT
828    X   33.050
829    Y   39.800
830 GOfX   0.000
831 GOfY   0.000
832 GOfZ-  3.000
833 GO Z-  3.175
834 REPEAT      04
835 GO Y-   0.995
836 GR Y    1.990
837    Z-   0.048
838 GR Y-   1.990
839    Z-   0.048
840 GR Y    1.990
841 GR Y-   1.990
842 GO X    0.000
843 GO Y-   0.356
844 REPEAT      03
845 GR X    0.198
846 GR Y-   0.198
847 CYCLE XY
848 REPEAT END
849 GO X    0.639
850 GO Y-   0.995
851 CYCLE XY
852 GO X    0.000
853 GO Y    0.000
854 REPEAT END
855 GOfZ   70.000
856 >REF COODS
857
858 ZERO AT
859    X   39.800
860    Y   17.750
861 GOfX   0.000
862 GOfY   0.000
863 GOfZ-  3.000
864 GO Z-  3.175
865 REPEAT      04
866 GO X-   0.995
867 GR X    1.990
868    Z-   0.048
869 GR X-   1.990
870    Z-   0.048
871 GR X    1.990
872 GR X-   1.990
873 GO X    0.356
874 GO Y-   0.000
875 REPEAT      03
876 GR X    0.198

877 GR Y-   0.198
878 CYCLE XY
879 REPEAT END
880 GO X    0.995
881 GO Y-   0.639
882 CYCLE XY
883 GO X    0.000
884 GO Y    0.000
885 REPEAT END
886 GOfZ   70.000
887 >REF COODS
888
889 ZERO AT
890    X   17.750
891    Y   11.000
892 GOfX   0.000
893 GOfY   0.000
894 GOfZ-  3.000
895 GO Z-  3.175
896 REPEAT      04
897 GO Y-   0.995
898 GR Y    1.990
899    Z-   0.048
900 GR Y-   1.990
901    Z-   0.048
902 GR Y    1.990
903 GR Y-   1.990
904 GO X    0.000
905 GO Y-   0.356
906 REPEAT      03
907 GR X    0.198
908 GR Y-   0.198
909 CYCLE XY
910 REPEAT END
911 GO X    0.639
912 GO Y-   0.995
913 CYCLE XY
914 GO X    0.000
915 GO Y    0.000
916 REPEAT END
917 GOfZ   70.000
918 >REF COODS
919
920 ZERO AT
921    X   11.000
922    Y   33.050
923 GOfX   0.000
924 GOfY   0.000
925 GOfZ-  3.000
926 GO Z-  3.175
927 REPEAT      04
928 GO X-   0.995
```

```
929 GR X    1.990
930    Z-   0.048
931 GR X-   1.990
932    Z-   0.048
933 GR X    1.990
934 GR X-   1.990
935 GO X    0.356
936 GO Y-   0.000
937 REPEAT     03
938 GR X    0.198
939 GR Y-   0.198
940 CYCLE XY
941 REPEAT END
942 GO X    0.995
943 GO Y-   0.639
944 CYCLE XY
945 GO X    0.000
946 GO Y    0.000
947 REPEAT END
948 GOfZ   70.000
949 >REF COODS
950
951 CALL SUB  03
952 SPINDLE  OFF
953 Z>ZMAX
954 HALT
955
956 SUB        01
957 HALT
958 DSPLY    XYZ
959 GOfX   26.505
960 GOfY  189.840
961 DSPLY    XY
962 HALT
963 GOfZ  100.000
964 DSPLY     Z
965 HALT
966 SUB RETURN
967
968 SUB        02
969 GOfZ   75.000
970 DSPLY     Z
971 HALT
972 SUB RETURN
973
974 SUB        03
975 >REF COODS
976 GOfX    1.500
977 GOfY    1.500
978 CALL SUB  04
979 GOfY   49.300
980 CALL SUB  04
981 SUB RETURN
982
983 SUB        04
984 GOfZ-  3.050
985 GO Z-  3.150
986 GR Z-  0.013
987 REPEAT     15
988 GRfZ    0.300
989 GRfZ-   0.300
990 GR Z-   0.005
991 REPEAT END
992 Z>C
993 SUB RETURN
994
995 SUB        05
996 >REF COODS
997 DWELL      01
998 GOfX   57.150
999 GOfY    0.000
1000 PROG.REF
1001 SUB RETURN
1002
1003 SUB        06
1004 GOfX-
171.450
1005 GOfY    0.000
1006 PROG.REF
1007 GOfX   82.550
1008 GOfY   25.400
1009 SUB RETURN
1010
1011 SUB        07
1012 F XY  =  4.5
1013 SUB RETURN
1014
1015 SUB        08
1016
1017 HALT
1018 GOfZ-  3.000
1019 HALT
1020 GO Z-  3.149
1021 HALT
1022 Z>C
1023 SUB RETURN
1024
1025 SUB        09
1026 F XY  =  0.5
1027 GR X    0.508
1028    Y-   0.508
1029 CALL SUB  11
1030 C-SIGN   X
1031 CALL SUB  12
1032 C-SIGN   Y
1033 CALL SUB  13
1034 C-SIGN   X
1035 CALL SUB  14
1036 C-SIGN   Y
1037 GR X-   0.508
1038    Y    0.508
1039 SUB RETURN
1040
1041 SUB        10
1042 F XY  =  0.5
1043 GR X    0.508
1044    Y-   0.508
1045 CALL SUB  07
1046 CYCLE XY
1047 GR X-   0.508
1048    Y    0.508
1049 SUB RETURN
1050
1051 SUB        11
1052 F XY  =  0.5
1053 GR X    0.203
1054    Y-   0.203
1055 GR X-   0.203
1056    Y    0.203
1057 CALL SUB  07
1058 SUB RETURN
1059
1060 SUB        12
1061 F XY  =  0.5
1062 GR X-   0.203
1063    Y-   0.203
1064 GR X    0.203
1065    Y    0.203
1066 CALL SUB  07
1067 SUB RETURN
1068
1069 SUB        13
1070 F XY  =  0.5
1071 GR X-   0.203
1072    Y    0.203
1073 GR X    0.203
1074    Y-   0.203
1075 CALL SUB  07
1076 SUB RETURN
1077
1078 SUB        14
1079 F XY  =  0.5
1080 GR X    0.203
1081    Y    0.203
1082 GR X-   0.203
1083    Y-   0.203
```

```
1084 CALL SUB   07        1136 GO Y-   3.058       1188 REPEAT END
1085 SUB RETURN           1137 CYCLE XY            1189 GO X    2.367
1086                      1138 GO X    0.000       1190 GO Y-   7.651
1087 SUB         15       1139 GO Y    0.000       1191 CYCLE XY
1088 F XY  =   0.5        1140 REPEAT END          1192 GO X    0.000
1089 GR Y    0.203        1141 SUB RETURN          1193 GO Y    0.000
1090    Y-   0.203        1142 SUB         51      1194 REPEAT END
1091 CALL SUB   07        1143 GOfX    0.000       1195 SUB RETURN
1092 SUB RETURN           1144 GOfY    0.000       1196 SUB         53
1093                      1145 GOfZ-   3.000       1197 GOfX    0.000
1094 SUB         16       1146 GO Z-   3.175       1198 GOfY    0.000
1095 F XY  =   0.5        1147 REPEAT     04       1199 GOfZ-   3.000
1096 GR Y-   0.203        1148 GO Y-   3.448       1200 GO Z-   3.175
1097    Y    0.203        1149 GR Y    6.897       1201 REPEAT     05
1098 CALL SUB   07        1150    Z-   0.048       1202 GO X-   7.651
1099 SUB RETURN           1151 GR Y-   6.897       1203 GR X   15.302
1100                      1152    Z-   0.048       1204    Z-   0.053
1101 SUB         17       1153 GR Y    6.897       1205 GR X-  15.302
1102 F XY  =   0.5        1154 GR Y    6.897       1206    Z-   0.053
1103 GR X    0.203        1155 GO X    0.000       1207 GR X   15.302
1104    X-   0.203        1156 GO Y-   0.391       1208 GR X-  15.302
1105 CALL SUB   07        1157 REPEAT     04       1209 GO X    5.284
1106 SUB RETURN           1158 GR X    0.755       1210 GO Y-   0.000
1107                      1159 GR Y-   0.755       1211 REPEAT     03
1108 SUB         18       1160 CYCLE XY            1212 GR X    0.755
1109 F XY  =   0.5        1161 REPEAT END          1213 GR Y-   0.755
1110 GR X-   0.203        1162 GO X    3.058       1214 CYCLE XY
1111    X    0.203        1163 GO Y-   3.448       1215 REPEAT END
1112 CALL SUB   07        1164 CYCLE XY            1216 GO X    7.651
1113 SUB RETURN           1165 GO X    0.000       1217 GO Y-   2.367
1114                      1166 GO Y    0.000       1218 CYCLE XY
1115 SUB         50       1167 REPEAT END          1219 GO X    0.000
1116 GOfX    0.000        1168 SUB RETURN          1220 GO Y    0.000
1117 GOfY    0.000        1169 SUB         52      1221 REPEAT END
1118 GOfZ-   3.000        1170 GOfX    0.000       1222 SUB RETURN
1119 GO Z-   3.175        1171 GOfY    0.000       1223 SUB         54
1120 REPEAT     04        1172 GOfZ-   3.000       1224 GOfX    0.000
1121 GO X-   3.448        1173 GO Z-   3.175       1225 GOfY    0.000
1122 GR X    6.897        1174 REPEAT     05       1226 GOfZ-   3.000
1123    Z-   0.048        1175 GO Y-   7.651       1227 GO Z-   3.175
1124 GR X-   6.897        1176 GR Y   15.302       1228 REPEAT     04
1125    Z-   0.048        1177    Z-   0.053       1229 GO Y-   3.057
1126 GR X    6.897        1178 GR Y-  15.302       1230 GR Y    6.115
1127 GR X-   6.897        1179    Z-   0.053       1231    Z-   0.055
1128 GO X    0.391        1180 GR Y   15.302       1232 GR Y-   6.115
1129 GO Y-   0.000        1181 GR Y-  15.302       1233    Z-   0.055
1130 REPEAT     04        1182 GO X    0.000       1234 GR Y    6.115
1131 GR X    0.755        1183 GO Y-   5.284       1235 GR Y-   6.115
1132 GR Y-   0.755        1184 REPEAT     03       1236 GO X    0.000
1133 CYCLE XY             1185 GR X    0.755       1237 GO Y-   0.954
1134 REPEAT END           1186 GR Y-   0.755       1238 REPEAT     02
1135 GO X    3.448        1187 CYCLE XY            1239 GR X    0.755
```

```
1240 GR Y-    0.755
1241 CYCLE XY
1242 REPEAT END
1243 GO X     2.104
1244 GO Y-    3.057
1245 CYCLE XY
1246 GO X     0.000
1247 GO Y     0.000
1248 REPEAT END
1249 SUB RETURN
1250 SUB           55
1251 GOfX     0.000
1252 GOfY     0.000
1253 GOfZ-    3.000
1254 GO Z-    3.175
1255 REPEAT        04
1256 GO X-    3.057
1257 GR X     6.115
1258    Z-    0.055
1259 GR X-    6.115
1260    Z-    0.055
1261 GR X     6.115
1262 GR X-    6.115
1263 GO X     0.954
1264 GO Y-    0.000
1265 REPEAT        02
1266 GR X     0.755
1267 GR Y-    0.755
1268 CYCLE XY
1269 REPEAT END
1270 GO X     3.057
1271 GO Y-    2.104
1272 CYCLE XY
1273 GO X     0.000
1274 GO Y     0.000
1275 REPEAT END
1276 SUB RETURN
1277 SUB           56
1278 GOfX     0.000
1279 GOfY     0.000
1280 GOfX     3.702
1281    Y-    3.312
1282 GOfZ-    3.000
1283 GO Z-    3.175
1284 REPEAT        04
1285 GR Z-    0.097
1286 CALL SUB      10
1287 REPEAT END
1288 SUB RETURN
1289 SUB           57
1290 GOfX     0.000
1291 GOfY     0.000
1292 GOfX     3.312
1293    Y-    3.702
1294 GOfZ-    3.000
1295 GO Z-    3.175
1296 REPEAT        04
1297 GR Z-    0.097
1298 CALL SUB      10
1299 REPEAT END
1300 SUB RETURN
1301 SUB           58
1302 GOfX     0.000
1303 GOfY     0.000
1304 GOfX     2.621
1305    Y-    7.905
1306 GOfZ-    3.000
1307 GO Z-    3.175
1308 REPEAT        05
1309 GR Z-    0.107
1310 CALL SUB      09
1311 REPEAT END
1312 SUB RETURN
1313 SUB           59
1314 GOfX     0.000
1315 GOfY     0.000
1316 GOfX     7.905
1317    Y-    2.621
1318 GOfZ-    3.000
1319 GO Z-    3.175
1320 REPEAT        05
1321 GR Z-    0.107
1322 CALL SUB      09
1323 REPEAT END
1324 SUB RETURN
1325 SUB           60
1326 GOfX     0.000
1327 GOfY     0.000
1328 GOfX     2.358
1329    Y-    3.311
1330 GOfZ-    3.000
1331 GO Z-    3.175
1332 REPEAT        04
1333 GR Z-    0.111
1334 GR X     0.508
1335    Y-    0.508
1336 CALL SUB      11
1337 C-SIGN   X
1338 CALL SUB      12
1339 C-SIGN   Y
1340 CALL SUB      13
1341 C-SIGN   X
1342 C-SIGN   Y
1343 GR X-    0.508
1344    Y     0.508
1345 REPEAT END
1346 SUB RETURN
1347 SUB           61
1348 GOfX     0.000
1349 GOfY     0.000
1350 GOfX     3.311
1351    Y-    2.358
1352 GOfZ-    3.000
1353 GO Z-    3.175
1354 REPEAT        04
1355 GR Z-    0.111
1356 GR X     0.508
1357    Y-    0.508
1358 C-SIGN   X
1359 CALL SUB      12
1360 C-SIGN   Y
1361 CALL SUB      13
1362 C-SIGN   X
1363 CALL SUB      14
1364 C-SIGN   Y
1365 GR X-    0.508
1366    Y     0.508
1367 REPEAT END
1368 SUB RETURN
1369 SUB           62
1370 GOfX     0.000
1371 GOfY     0.000
1372 GOfZ-    3.000
1373 GO Z-    3.175
1374 REPEAT        03
1375 GO X-    0.768
1376 GR X     1.536
1377    Z-    0.046
1378 GR X-    1.536
1379    Z-    0.046
1380 GR X     1.536
1381 GR X-    1.536
1382 GO X     0.189
1383 GO Y-    0.000
1384 REPEAT        02
1385 GR X     0.198
1386 GR Y-    0.198
1387 CYCLE XY
1388 REPEAT END
1389 GO X     0.768
1390 GO Y-    0.579
1391 CYCLE XY
1392 C-SIGN   X
1393 C-SIGN   Y
1394 C-SIGN   X
1395 CALL SUB      14
```

```
1396 C-SIGN   Y
1397 GO X     0.000
1398 GO Y    0.000
1399 REPEAT END
1400 SUB RETURN
1401 SUB         63
1402 GOfX    0.000
1403 GOfY    0.000
1404 GOfZ-   3.000
1405 GO Z-   3.175
1406 REPEAT      03
1407 GO Y-   0.768
1408 GR Y    1.536
1409    Z-   0.046
1410 GR Y-   1.536
1411    Z-   0.046
1412 GR Y    1.536
1413 GR Y-   1.536
1414 GO X    0.000
1415 GO Y-   0.189
1416 REPEAT      02
1417 GR X    0.198
1418 GR Y-   0.198
1419 CYCLE XY
1420 REPEAT END
1421 GO X    0.579
1422 GO Y-   0.768
1423 CYCLE XY
1424 C-SIGN   X
1425 C-SIGN   Y
1426 CALL SUB   13
1427 C-SIGN   X
1428 C-SIGN   Y
1429 GO X    0.000
1430 GO Y    0.000
1431 REPEAT END
1432 SUB RETURN
1433 SUB         64
1434 GOfX    0.000
1435 GOfY    0.000
1436 GOfZ-   3.000
1437 GO Z-   3.175
1438 REPEAT      05
1439 GO X-   0.404
1440 GR X    0.809
1441    Z-   0.053
1442 GR X-   0.809
1443    Z-   0.053
1444 GR X    0.809
1445 GR X-   0.809
1446 GO X    0.014
1447 GO Y-   0.000
1448 GR X    0.198
1449 GR Y-   0.198
1450 CYCLE XY
1451 GO X    0.404
1452 GO Y-   0.390
1453 CYCLE XY
1454 GO X    0.000
1455 GO Y    0.000
1456 REPEAT END
1457 SUB RETURN
1458 SUB         65
1459 GOfX    0.000
1460 GOfY    0.000
1461 GOfZ-   3.000
1462 GO Z-   3.175
1463 REPEAT      05
1464 GO Y-   0.404
1465 GR Y    0.809
1466    Z-   0.053
1467 GR Y-   0.809
1468    Z-   0.053
1469 GR Y    0.809
1470 GR Y-   0.809
1471 GO X    0.000
1472 GO Y-   0.014
1473 GR X    0.198
1474 GR Y-   0.198
1475 CYCLE XY
1476 GO X    0.390
1477 GO Y-   0.404
1478 CYCLE XY
1479 GO X    0.000
1480 GO Y    0.000
1481 REPEAT END
1482 SUB RETURN
1483
1484 END
```

What is claimed is:

1. A method for optimally operating a computer numerical control (CNC) milling machine to form in a substrate at least one cavity for a plurality of electronic components of a high density interconnect structure to be interconnected by a multi-layer interconnect structure overlying and bonded to the substrate and the components based on locations and dimensions of the components and thus locations and dimensions of an initial set of cavities corresponding to the components on a one-for-one basis, particular neighboring cavities of the initial set either overlapping or being separated by walls, said method comprising the steps of:

forming a representation of the location and dimensions of each of the cavities of the initial set;

enhancing the representation to represent locations and dimensions of cavities of an optimized set; and generating CNC program instructions for forming the cavities of the optimized set.

2. A method in accordance with claim 1, wherein the step of enhancing the representative to represent locations and dimensions of cavities of an optimized set comprises selectively removing walls separating neighboring cavities having less than a predetermined wall thickness by extending at least one of the cavities to meet another cavity.

3. A method in accordance with claim 1 wherein the step of enhancing the representation to represent locations and dimensions of cavities of an optimized set comprises:

determining which, if any, cavities of the initial set overlap, are in alignment, and have depths within a predetermined tolerance of each other; and combining each group of such overlapping cavities to define a single, respective cavity.

4. A method in accordance with claim 2 wherein the step of enhancing the represenation to represent locations and dimension of cavities of an optimized set further comprises, after the combining step:

selectively removing walls separating neighboring cavities having less than a predetermined wall thickness by extending at least one of the cavities to meet another cavity.

5. A method in accordance with claim 4, wherein the step of selectively removing walls separating neighboring cavities comprises extending a shallower one of the neighboring cavities to meet a depper one of the neighboring cavities.

6. A method in accordance with claim 4, wherein the step of selectively removing walls separating neighboring cavities comprises, for each cavity:

examining each adjacent cavity to determine if it is at least partially in alignment therewith and sharing a common wall therewith and, for each such adjacent cavity at least partially in alignment therewith and sharing a common wall therewith, removing said common wall if it has a thickness less than a predetermined minimum thickness.

7. A method in accordance with claim 6, wherein the step of removing said common wall comprises extending a shallower one of said each cavity and said each adjacent cavity to meet a deeper one of said each cavity and said each adjacent cavity.

8. A method in accordance with claim 1, wherein the step of generating CNC program instructions comprises generating instructions for tool movement which minimize milling tool wear when milling a ceramic substrate.

* * * * *